(12) United States Patent
Kasame et al.

(10) Patent No.: US 7,213,097 B2
(45) Date of Patent: May 1, 2007

(54) ELECTRONIC CONTROL UNIT AND ELECTRONIC DRIVING UNIT

(75) Inventors: Tomohide Kasame, Hyogo (JP); Yoshikazu Hashimoto, Hyogo (JP); Yuichiro Shimizu, Hyogo (JP); Nobunori Asayama, Hyogo (JP); Akio Okahara, Hyogo (JP); Kazuhiro Komatsu, Hyogo (JP); Takashi Higuchi, Hyogo (JP)

(73) Assignee: Fujitsu Ten Limited, Kobe-shi (JP)

( * ) Notice: Subject to any disclaimer, the term of this patent is extended or adjusted under 35 U.S.C. 154(b) by 363 days.

(21) Appl. No.: 10/763,318

(22) Filed: Jan. 26, 2004

(65) Prior Publication Data

US 2004/0236873 A1    Nov. 25, 2004

(30) Foreign Application Priority Data

Jan. 27, 2003  (JP) .......................... P.2003-017861
Mar. 14, 2003  (JP) .......................... P.2003-070895

(51) Int. Cl.
*G06F 13/00*  (2006.01)

(52) U.S. Cl. ........................................ 710/317; 710/2
(58) Field of Classification Search .............. 710/5–12, 710/31–33, 316–317, 244; 370/220, 401–409
See application file for complete search history.

(56) References Cited

U.S. PATENT DOCUMENTS

| | | | |
|---|---|---|---|
| 5,953,314 A * | 9/1999 | Ganmukhi et al. ......... 370/220 |
| 6,021,115 A * | 2/2000 | Simpson et al. ............. 370/235 |
| 6,598,132 B2 * | 7/2003 | Tran et al. .................... 711/154 |
| 6,687,781 B2 * | 2/2004 | Wynne et al. ............... 710/317 |
| 6,990,541 B2 * | 1/2006 | Clayton ....................... 710/244 |
| 2002/0048280 A1 * | 4/2002 | Lee et al. .................... 370/468 |
| 2002/0101865 A1 * | 8/2002 | Takagi et al. ............... 370/360 |
| 2003/0123468 A1 * | 7/2003 | Nong .......................... 370/412 |
| 2004/0019732 A1 * | 1/2004 | Overtoom et al. .......... 710/313 |
| 2004/0076154 A1 * | 4/2004 | Mizutani et al. ............ 370/389 |
| 2005/0062497 A1 * | 3/2005 | Pellizzer et al. .............. 326/41 |
| 2005/0094644 A1 * | 5/2005 | Konda ...................... 370/395.4 |
| 2005/0201396 A1 * | 9/2005 | Sindhu et al. ............... 370/401 |

FOREIGN PATENT DOCUMENTS

JP      A 5-171997      7/1993
JP      A 6-161987      6/1994

* cited by examiner

*Primary Examiner*—Christopher Shin
(74) *Attorney, Agent, or Firm*—Oliff & Berridge, PLC

(57) ABSTRACT

An input processing circuit is interposed between input terminals and input ports of an MPU. An output processing circuit is interposed between output ports of the MPU and output terminals. The input processing circuit includes switch sections and processing sections. The output processing circuit includes switch sections and processing sections. A switch control section switches the switch sections based on switch information stored in a switch information storage section to switch a connection relationship between the input terminals and the input ports, processing for an input signal, a connection relationship between the output ports and the output terminals, and processing for an output signal.

24 Claims, 26 Drawing Sheets

FIG. 4 (a)

| INPUT TERMINAL T1 | PROCESSING A | INPUT PORT P2 |
|---|---|---|
| INPUT TERMINAL T2 | PROCESSING B | INPUT PORT P3 |
| INPUT TERMINAL T3 | PROCESSING C | INPUT PORT P1 |

FIG. 4 (b)

| INPUT TERMINAL T1 | SWITCH S11 | SWITCH S21 | SWITCH S31 | SWITCH S42 |
|---|---|---|---|---|
| INPUT TERMINAL T2 | SWITCH S12 | SWITCH S22 | SWITCH S32 | SWITCH S43 |
| INPUT TERMINAL T3 | SWITCH S13 | SWITCH S23 | SWITCH S33 | SWITCH S41 |

FIG. 5 (a)

| INPUT TERMINAL T1 | PROCESSING B | INPUT PORT P2 |
|---|---|---|
| INPUT TERMINAL T2 | PROCESSING A | INPUT PORT P3 |
| INPUT TERMINAL T3 | PROCESSING C | INPUT PORT P1 |

FIG. 5 (b)

| INPUT TERMINAL T1 | SWITCH S11 | SWITCH S22 | SWITCH S32 | SWITCH S42 |
|---|---|---|---|---|
| INPUT TERMINAL T2 | SWITCH S12 | SWITCH S21 | SWITCH S31 | SWITCH S43 |
| INPUT TERMINAL T3 | SWITCH S13 | SWITCH S23 | SWITCH S33 | SWITCH S41 |

FIG. 14

| | PROCESSING A | PROCESSING B | PROCESSING C | PROCESSING D | ⋯ |
|---|---|---|---|---|---|
| AUTHORITY LEVEL 2 | PERMIT | PERMIT | PERMIT | PERMIT | |
| AUTHORITY LEVEL 1 | PERMIT | NOT PERMITTED | NOT PERMITTED | PERMIT | |
| AUTHORITY LEVEL 0 | NOT PERMITTED | NOT PERMITTED | NOT PERMITTED | NOT PERMITTED | |

7a

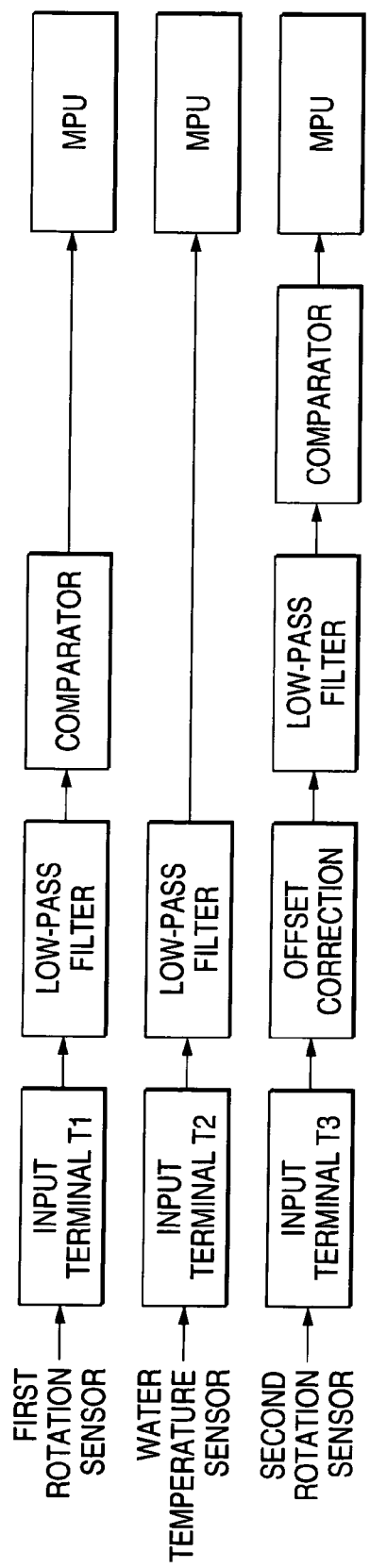
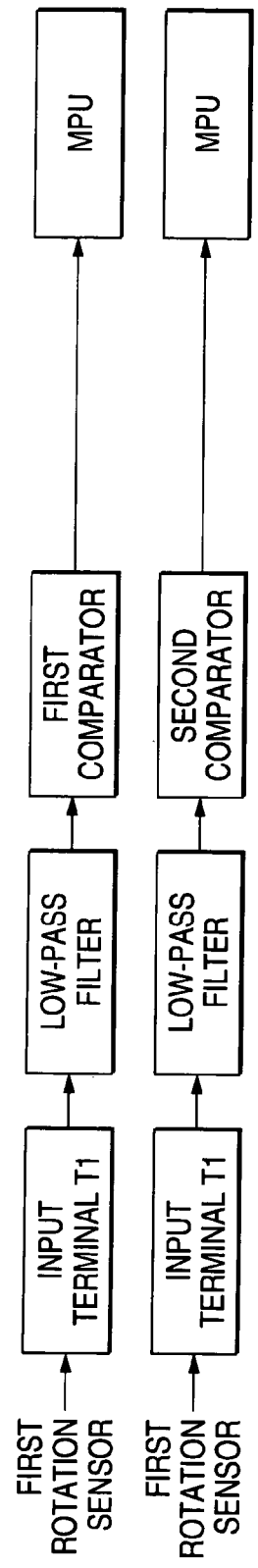
FIG. 20 (a)
FIG. 20 (b)

ELECTRONIC CONTROL UNIT AND ELECTRONIC DRIVING UNIT

The present disclosure relates to the subject matter contained in Japanese Patent Application No. 2003-17861 filed on Jan. 27, 2003 and Japanese Patent Application No. 2003-70895 filed on Mar 14, 2003, which are incorporated herein by reference in its entirety.

BACKGROUND OF THE INVENTION

1. Field of the Invention

This invention relates to an electronic control unit for performing arithmetic processing of an input signal input from an input terminal and outputting a control signal and in particular to an electronic control unit and an electronic drive unit for making it possible to change processing.

2. Description of Related Arts

In recent years, an electronic control unit (ECU) has been installed in a vehicle for electronically controlling various types of processing required in operating the vehicle. For example, the ECU is applied to control of jet of an engine and a speed sensor, a water temperature sensor, and the like are connected thereto, whereby the gasoline jet amount can be controlled in response to the speed of the vehicle and the coolant temperature of the engine.

Such a vehicle-installed ECU often differs in input/output signals and the processing operation depending on the type of vehicle, the country in which the vehicle runs, etc. Then, there is demand for making it possible to change settings of the vehicle-installed ECU so as to be able to accept input varying from one vehicle to another and execute the necessary processing operation.

To meet this command, in a vehicle-installed ECU in a conventional art, different types of processing operation are previously stored as programs and the programs are switched for changing settings (for example, JP-A-Hei.5-171997).

To check the operation of a program at the developing time, a simulator of a control unit for switching input/output signals to/from a CPU is designed (for example, JP-A-Hei.6-161987).

SUMMARY OF THE INVENTION

In the ECU in the conventional art, the programs can be switched for selecting the processing operation; however, the format of an input/output signal cannot be changed. For example, if the voltage of an input signal changes as the design is changed, the input voltage needs to be adjusted, but changing the voltage involves changing the hardware and therefore switching the programs cannot change the voltage. Likewise, if the necessary output format is changed or the connection relationship between terminals and input/output signals is changed, it also becomes necessary to change the hardware. Thus, it is impossible to change the settings of the hardware components in the ECU by switching the programs, and the circuit configuration of the ECU needs to be changed.

The above-described simulator has a function of switching input/output signals to check the operation of a program at the developing time, but the hardware configuration cannot be changed in the actual product after the checking is complete. However, it becomes necessary to change processing not only at the developing time of the ECU, but also at the installing time of the ECU in a vehicle and at the repairing time of the ECU.

That is, in the ECU in the conventional art, after the development is complete, the hardware cannot be changed and changing of processing is limited to changing of the program; this is a problem. Thus, if it becomes necessary to change the hardware, designing and manufacturing of the ECU are again conducted from the beginning; the time and the cost are required. Since a different ECU needs to be manufactured for each type of vehicle, there is a problem of furthermore increasing the cost.

Similar problems also occur in an electronic drive unit (EDU). This EDU performs processing of filtering, etc., for an input signal and then gives any desired drive current for outputting the signal. The processing for the input signal and giving the drive current are often accomplished by hardware and therefore it is difficult to make a change after the development is complete.

It is therefore an object of the invention to provide an electronic control unit and an electronic drive unit for making it possible to change processing.

To solve the above problem and achieve the object, an electronic control unit (1) performs operation processing of an input signal and outputs a control signal. The electronic control unit includes an operation processing section, which executes the operation processing, an input processing circuit, which executes predetermined processing for the input signal and supplies the processed signal to the operation processing section, and a processing switch section, which switches the predetermined processing of the input processing circuit.

According to an electronic control unit (2), in the electronic control unit (1), the processing switch section stores processing, which the input processing circuit is able to execute, as input processing information and switches the processing of the input processing circuit based on the input processing information.

The electronic control unit (2) switches the input processing circuit based on the input processing information. Thus, the electronic control unit (2) can switch the processing, which the input processing circuit is able to execute, as required. Further, the electronic control unit (2) can change switch as the input information is changed.

According to an electronic control unit (3), in the electronic control unit (1) or (2), the processing switch section switches the processing of the input processing circuit based on an operation result output by the operation processing section.

In the electronic control unit (3), when the processing for the input signal is changed based on the operation result of the operation processing section, different processing can be performed for the same input signal in response to the operation processing.

According to an electronic control unit (4), in the electronic control unit (1), (2), or (3), the processing switch section switches the processing of the input processing circuit in a time-sharing manner.

The electronic control unit (4) switches the processing of the input processing circuit in a time-sharing manner. Thus, the electronic control unit (4) can switch processing for the input signal in response to the processing state of the operation processing. If the electronic control unit (4) includes a plurality of input terminals, processing of the input processing circuit can be shared.

According to an electronic control unit (5), in any one of the electronic control units (1) to (4), the input processing circuit includes a plurality of processing circuits different in processing for the input signal, and an input switch, which inputs the input signal to one of the plurality of processing circuits.

The electronic control unit (5) includes the plurality of processing circuits different in processing and switches the processing circuit to which the input signal is to be input for changing processing for the input signal.

According to an electronic control unit (6), in the electronic control unit (5), the input processing circuit includes a plurality of processing circuits for executing the same processing for the input signal. When an anomaly occurs in the processing circuit, which is executing the processing, the processing switch section switches the processing circuit to another processing circuit for executing the same processing.

The electronic control unit (6) switches the processing circuits, which execute the same processing for the input signal. Thus, if an anomaly occurs in the processing circuit, which is operating, the standby circuit can be used to continue the processing.

According to an electronic control unit (7), in any one of the electronic control units (1) to (4), the input processing circuit executes the predetermined processing for the input signal by a programmable IC. The processing switch section rewrites the programmable IC to switch the predetermined processing.

The electronic control unit (7) can execute processing for the input signal by the programmable IC in which processing can be rewritten, and can change the processing by rewriting the programmable IC.

According to an electronic control unit (8), in any one of the electronic control units (1) to (4), the input processing circuit includes an analog/digital converter, which converts the input signal into a digital signal, and a logical IC, which executes the predetermined processing for the digital signal converted by the analog/digital converter. The processing switch section rewrites processing stored in the logical IC to switch the predetermined processing.

The electronic control unit (8) can A/D-convert the input signal and then can process the input signal by the logical IC and change processing by rewriting a program stored in the logical IC.

According to an electronic control unit (9), in any one of the electronic control units (1) to (8), the input terminal is a plurality of input terminals. The input processing circuit switches a connection relationship between the plurality of input terminals and the operation processing section.

The electronic control unit (9) can switch the connection relationships among a plurality of input terminals and the operation processing section to switch the input signal input to the operation processing section.

According to an electronic control unit (10), in the electronic control unit (9), the input processing circuit executes separate processing for input signals input from the plurality of input terminals, respectively.

The electronic control unit (10) can separately perform the processing for the input signals input from the plurality of input terminals, respectively, to process the input signals in parallel.

An electronic control unit (11), in any one of the electronic control units (1) to (10), further includes an output processing circuit which executes second predetermined processing for an operation result output by the operation processing section and outputs a processing result as the control signal. The processing switch section switches the second predetermined processing of the output processing circuit.

According to an electronic control unit (12), in the electronic control unit (11), the second predetermined processing is processing for giving a predetermined drive current to the operation result.

The electronic control unit (12) can switch the drive current given to the operation result output by the operation processing section as desired.

According to an electronic control unit (13), in the electronic control unit (12), the output processing circuit includes a plurality of driver circuits. The output processing circuit uses the plurality of driver circuits in combination to generate the drive current given to the operation result.

The electronic control unit (13) generates the drive current given to the operation result of the operation processing section using the driver circuits in combination to increase the number of the drive currents that can be selected.

An electronic control unit (14), in the electronic control unit (13), further includes a plurality of output terminals. The output processing circuit includes a dedicated driver circuit group assigned to the plurality of output terminals. The output processing circuit selects at least one driver circuit used to generate the drive current from the dedicated driver circuit group.

The electronic control unit (14) can assign dedicated driver circuits to the plurality of output terminals and uses the driver circuits in combination to give different drive current for each output terminal.

An electronic control unit (15), in the electronic control unit (13), further includes a plurality of output terminals. The output processing circuit includes a shared driver circuit group shared among the plurality of output terminals. The output processing circuit selects at least one driver circuit used to generate the drive current from the shared driver circuit group.

The electronic control unit (15) can select the driver circuit to be assigned for each output terminal from the driver circuit group shared among the output terminals to assign different drive currents to the output terminals.

An electronic control unit (16), in any one of the electronic control units (1) to (15), further includes a switch management section, which determines whether or not the switching of the processing is permitted, when the processing switch section switches the predetermined processing.

The electronic control unit (16) includes the switch management section, which determining whether or not processing switch is permitted in switching of processing, so that switching of processing is limited.

According to an electronic control unit (17), in the electronic control unit (16), the switch management section sets request authority for the content of the switching.

The electronic control unit (17) can set request authority for each type of processing to determine whether or not the switching of the processing is permitted for each processing to be switched.

According to an electronic control unit (18), in the electronic control unit (17), if an identification signal satisfying the request authority is input in the switching, the switch management section permits the switching of the processing.

The electronic control unit (18) manages permission or prohibition of the switching depending on whether or not the identification signal satisfying the request authority is input.

According to an electronic control unit (19), in the electronic control unit (17), if a switch request for the switching of the processing is input and data indicating the switch request-contains authority information satisfying the request authority, the switch management section permits the switching requested by the switch request.

The electronic control unit (19) determines whether or not the switching of the processing is permitted depending on whether or not the data indicating the switch request contains authority information satisfying the request authority.

According to an electronic control unit (20), in the electronic control unit (16), the switch management section includes a position information acquisition section, which acquires position information. The switch management section determines whether or not the switching is permitted based on the position information acquired by the position information acquisition section.

The electronic control unit (20) determines whether or not the switching is permitted based on the position information. Thus, the electronic control unit (20) can permit the switching only in a predetermined location.

An electronic control unit (21) performs operation processing of an input signal and outputs a control signal. The electronic control unit (21) includes an input terminal to which the input signal is input, an operation processing section, which executes the operation processing, an output processing circuit, which executes predetermined processing for an operation result output by the operation processing section and outputs a processing result as the control signal, and a processing switch section, which switches the predetermined processing of the output processing circuit.

An electronic control unit (22) performs operation processing of a plurality of input signals and outputs a control signal. The electronic control unit (22) includes an input terminal to which the input signal is input, an operation processing section, which executes the operation processing, an input processing circuit including a plurality of processing circuits, which execute predetermined processing for each of the plurality of input signals and supply the processed signals to the operation processing section, and to which each of the plurality of input signals are able to be input in common, and selection means, which selects at least one of the plurality of processing circuits for the input signals and inputs the input signals to the selected processing circuit.

According to an electronic control unit (23), in the electronic control unit (22), the selection means selects a plurality of processing circuits based on the input signal.

The electronic control unit (23) can change the combination of the processing circuits in the input processing circuit based on the input signal to execute processing fitted to the input signal.

According to an electronic control unit (24), in the electronic control unit (22) or (23), the selection means includes a switch section which switches connection between the input signal and the processing circuit. The selection means controls the switching of the switch section to select at least one processing circuit.

The electronic control unit (24) switches the connection between the input terminal and the processing circuit to select the processing circuit for each of a plurality of input signals.

An electronic control unit (25) performs operation processing of an input signal and outputs a control signal. The electronic control unit (25) includes an input terminal to which the input signal is input, an operation processing section, which executes the operation processing, and an input processing circuit, which executes predetermined processing for the input signal and supplies the processed signal to the operation processing section. The input processing circuit switches the predetermined processing based on an processing change request received from an external.

An electronic drive unit (1) executes predetermined processing for an input signal, gives a predetermined drive current to a processing result, and outputs the result. The electronic drive unit (1) includes a processing switch section which switches at least either of the predetermined processing and a value of the predetermined drive current given to the processing result.

The electronic drive unit (1) makes it possible to set processing for the input signal and/or the value of the drive current given to the processing result as desired.

BRIEF DESCRIPTION OF THE DRAWINGS

FIG. 4 is schematic representations to describe connection information stored in a switch information storage section shown in FIG. 1.

FIG. 5 is schematic representations to describe changing of the connection information shown in FIG. 4.

FIG. 14 is a schematic representation to describe authority data shown in FIG. 13.

FIG. 20 is schematic representations to describe specific examples of the operation of the ECU shown in FIG. 17.

DETAILED DESCRIPTION OF THE PREFERRED EMBODIMENTS

Referring now to the accompanied drawings, there are shown preferred embodiments of an electronic control unit (ECU) and an electronic drive unit (EDU) according to the invention.

(First Embodiment)

Figure 1:
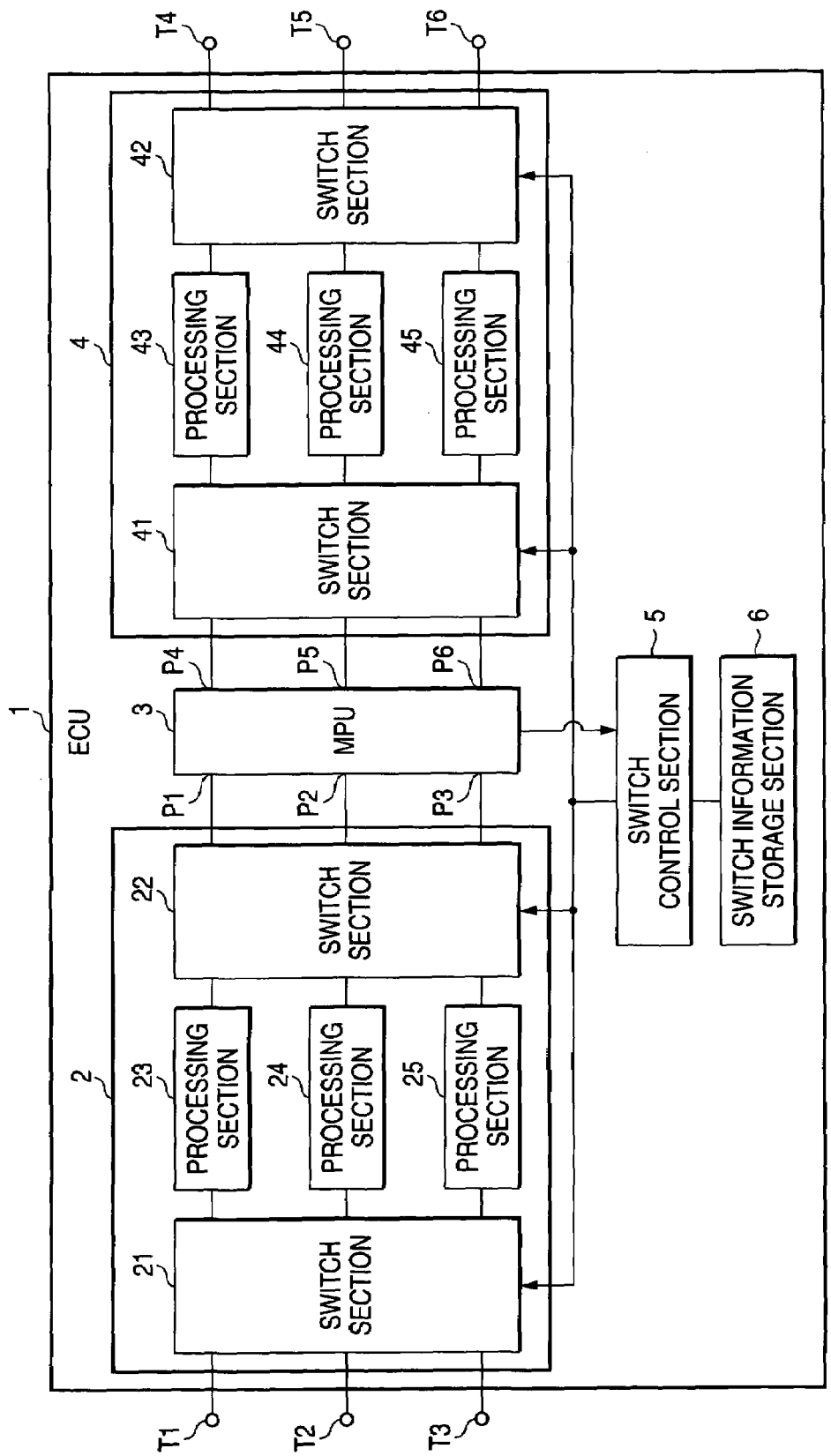
FIG. 1 is a schematic representation to describe the schematic configuration of an ECU according to a first embodiment of the invention.

To begin with, the schematic configuration of an ECU 1 according to a first embodiment of the invention will be discussed. FIG. 1 is a schematic representation to describe the schematic configuration of the ECU 1 according to the first embodiment of the invention. In FIG. 1, the ECU 1 includes input terminals T1 to T3, an input processing circuit 2, an MPU 3, an output processing circuit 4, output terminals T4 to T6, a switch control section 5, and a switch information storage section 6.

Further, the input processing circuit 2 contains a switch section 21, processing sections 23 to 25, and a switch section 22. Each of the processing sections 23 to 25 has a function of executing predetermined processing for an input signal, and the switch section 21 switches the connection relationships between the input terminals T1 to T3 and the processing sections 23 to 25. The switch section 22 switches the connection relationships between the processing sections 23 to 25 and input ports P1 to P3 of the MPU 3.

Therefore, the input signal input from the input terminal T1 to T3 is processed by any of the processing sections 23 to 25 and then is input to any of the input ports P1 to P3. The connection relationships among the input terminals T1 to T3, the processing sections 23 to 25, and the input ports P1 to P3 are switched by the switch sections 21 and 22, whereby processing for the input signal can be set and which port of the MPU 3 the processed input signal is input to can be set as desired.

The MPU 3, which contains a processor and memory, performs operations on the input signal from the input port P1 to P3 based on an internally stored program and outputs the operation result from output ports P4 to P6. Here, the operation processing is performed by the MPU, but an ASIC, etc., may be used so long as it can execute desired operation processing.

The output processing circuit 4 contains a switch section 41, processing sections 43 to 45, and a switch section 42. Each of the processing sections 43 to 45 has a function of executing predetermined processing for the operation result of the MPU 3, and the switch section 41 switches the connection relationships between the output ports P4 to P6 and the processing sections 43 to 45. The switch section 42 switches the connection relationships between the processing sections 43 to 45 and the output terminals T4 to T6.

Therefore, the operation result output from the output port P4 to P6 is processed by any of the processing sections 43 to 45 and then is output from any of the output terminals T4 to T6. The connection relationships among the output ports P4 to P6, the processing sections 43 to 45, and the output terminals T4 to T6 are switched by the switch sections 41 and 42, whereby processing for the operation result of the MPU 3 can be set and which terminal the processed operation result is output from can be set as desired.

The switch control section 5 transmits a switch request to the switch sections 21 and 22 for changing the connection relationships among the input terminals T1 to T3, the processing sections 23 to 25, and the input ports P1 to P3. The switch control section 5 also transmits a switch request to the switch sections 41 and 42 for changing the connection relationships among the output ports P4 to P6, the processing sections 43 to 45, and the output terminals T4 to T6.

The switch information storage section 6 stores switch information associating the connection relationships among the terminals, the ports, and the processing sections with the settings of the switch sections 21, 22, 41, and 42. The switch control section 5 can transmit a switch request to the switch sections 21, 22, 41, and 42 based on the switch information stored in the switch information storage section 6, for changing the settings of the switch sections 21, 22, 41, and 42 so as to realize any desired connection relationships.

Further, the switch information stored in the switch information storage section 6 can be rewritten for changing the correspondence between the connection relationships among the terminals, the ports, and the processing sections and the settings of the switch sections.

Figure 2:
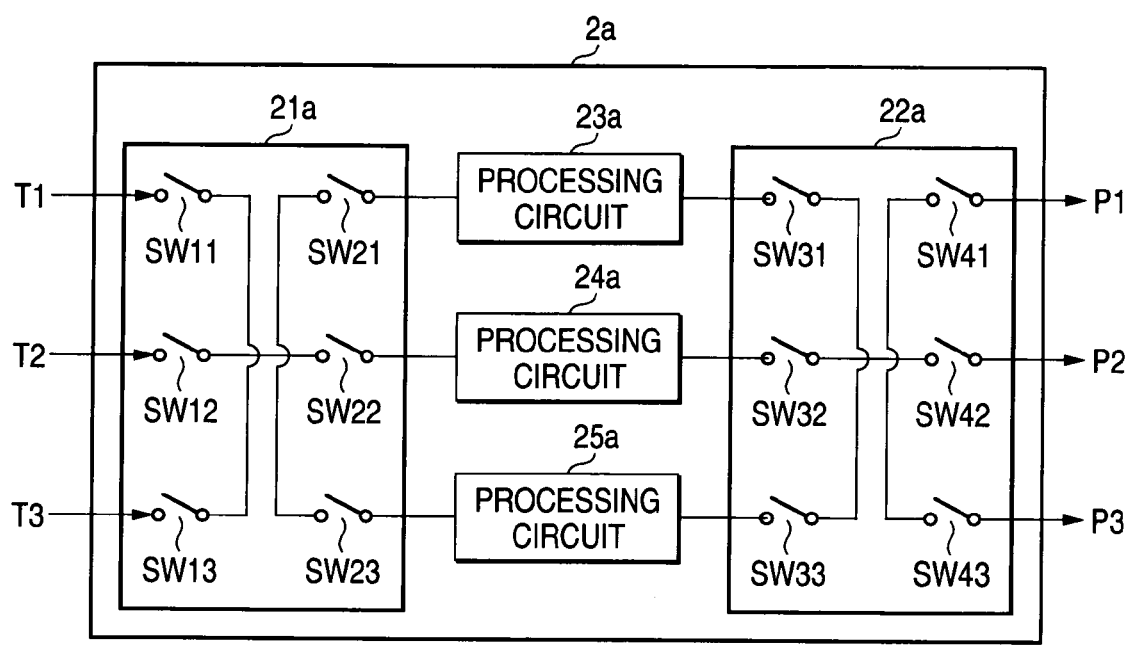
FIG. 2 is a diagram to show an example of an input processing circuit provided with separate processing circuits corresponding to processing sections shown in FIG. 1.

Next, a specific configuration example of the input processing circuit will be discussed. FIG. 2 is a diagram to show an example of the input processing circuit provided with separate processing circuits corresponding to the processing sections 23 to 25. In FIG. 2, an input processing circuit 2a includes a processing circuit 23a for accomplishing processing corresponding to the processing section 23, a processing circuit 24a for accomplishing processing corresponding to the processing section 24, and a processing circuit 25a for accomplishing processing corresponding to the processing section 25, separately.

A switch section 21a includes switches SW11 to SW13 and switches SW21 to SW23. The switches SW11 to SW13 are switches for performing on/off control of the input terminals T1 to T3, respectively. The switches SW21 to SW23 are switches for performing on/off control of the processing circuits 23a to 25a, respectively. Therefore, as any of the switches SW11 to SW13 is turned on, the input terminal of T1 to T3 corresponding to the switch which is turned on can be selected and as any of the switches SW21 to SW23 is turned on, the processing circuit of 23a to 25a corresponding to the switch which is turned on can be selected.

Likewise, a switch section 22a includes switches SW31 to SW33 and switches SW41 to SW43. The switches SW31 to SW33 are switches for performing on/off control of the processing circuits 23a to 25a, respectively. The switches SW41 to SW43 are switches for performing on/off control of the input ports P1 to P3, respectively. Therefore, as any of the switches SW31 to SW33 is turned on, the processing circuit of 23a to 25a corresponding to the switch which is turned on can be selected and as any of the switches SW41 to SW43 is turned on, the input port of P1 to P3 corresponding to the switch which is turned on can be selected.

Thus, the processing circuits 23a to 25a are provided separately and any input terminal, any processing circuit, and any input port are selected, whereby the connection relationship between the input terminal and the input port and processing for an input signal can be set as desired.

Figure 3:
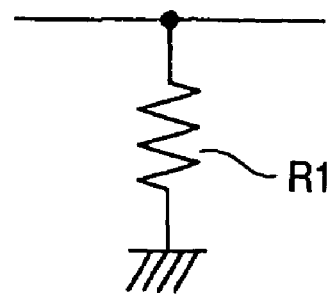
FIG. 3 is drawings to describe circuit examples of the processing circuits shown in FIG. 2.
Figure 3:
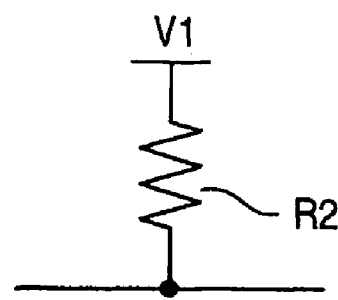
Figure 3:
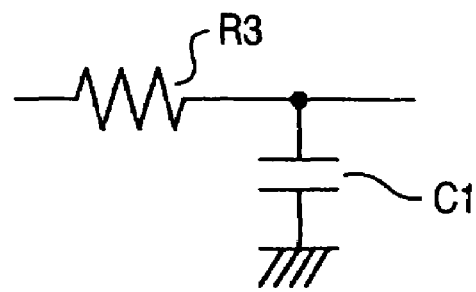
Figure 3:
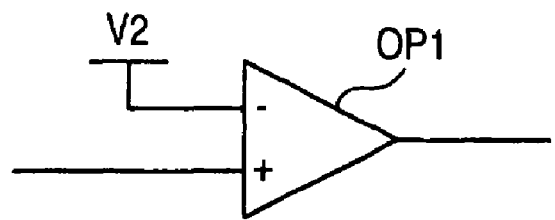

The processing circuits 23a to 25a perform processing of voltage adjustment, filtering, signal shaping, etc., of an input signal. FIG. 3 shows circuit examples that can be used as the processing circuits 23a to 25a. FIG. 3(a) shows a pull-down circuit using a resistor R1 for stabilizing low potential in the input signal. FIG. 3(b) shows a pull-up circuit using a resistor R2 and a constant voltage V1 for stabilizing high potential in the input signal.

Further, FIG. 3(c) shows a filter circuit using a resistor R3 and a capacitor C1 for removing the frequency determined by the resistor R3 and the capacitor C1. FIG. 3(d) shows a comparator using an operational amplifier OP1 and a constant voltage V2 for making a comparison between the potential of the input signal and the constant voltage V2 and outputting the comparison result.

These circuit configurations are used as the processing circuits 23a to 25a, whereby voltage adjustment, filtering, and signal shaping can be accomplished. The functions accomplished by the processing circuits are not limited to them; for example, any other configuration of a multiplication circuit, etc., may be adopted.

To thus select any of the processing circuits 23a to 25a under the switch control of the switch sections 21a and 22a, the switch information storage section 6 stores connection information shown in FIG. 4. FIG. 4(a) is a drawing to show the connection relationships among the terminals, the ports, and the processing circuits. FIG. 4(b) is a drawing to show the settings of the switches corresponding to FIG. 4(a).

FIG. 4(a) indicates that processing A is performed for the input signal from the input terminal T1 and the result is supplied to the input port P2. Likewise, FIG. 4(a) indicates that processing B is performed for the input signal from the input terminal T2 and the result is supplied to the input port P3 and that processing C is performed for the input signal from the input terminal T3 and the result is supplied to the input port P1. Here, the processing A is processing accomplished by the processing circuit 23a, the processing B is processing accomplished by the processing circuit 24a, and the processing C is processing accomplished by the processing circuit 25a.

In the settings of the switches shown in FIG. 4(b), the switches to be turned on are specified corresponding to the connection relationships shown in FIG. 4(a). Specifically, FIG. 4(b) indicates that the switches S11, S21, S31, and S42 are turned on for the input signal from the input terminal T1. FIG. 4(b) also indicates that the switches S12, S22, S32, and S43 are turned on for the input signal from the input terminal T2 and that the switches S13, S23, S33, and S41 are turned on for the input signal from the input terminal T3.

Thus, the switches to be turned on are specified corresponding to any desired connection state, whereby any desired processing and input port can be assigned to each input terminal.

By the way, to change the processing and input port assigned to each input terminal, the switch information can be rewritten. For example, to change processing for the input terminal T1 to the processing B and processing for the input terminal T2 to the processing A as shown in FIG. 5(a), the settings of the switches can be changed as shown in FIG. 5(b). Specifically, in FIG. 5(b), the switches S11, S22, S32, and S42 are turned on for the input signal from the input terminal T1 and the switches S12, S21, S31, and S43 are turned on for the input signal from the input terminal T2.

Thus, as the switch information is rewritten, the processing and input port assigned to the input terminal can be changed. The switch information may be rewritten according to external input or based on the operation result of the MPU 3.

In the embodiment, the following connection switch can also be performed: Generally, processing circuit switching described above is performed corresponding to each vehicle type, but can also be applied if the specifications are changed in the same vehicle type.

For example, a sensor signal is adopted as an input signal in the vehicle-installed ECU and the characteristic of the sensor signal may change with time. To cope with the change with time, it is desirable that the characteristic value of the processing circuit should be changed. A filter circuit can be named as such a processing circuit.

Then, a filter circuit (called processing D) having a different frequency characteristic from that of a filter circuit (called processing B) as in FIG. 3(b) is provided as a reserve circuit in the input processing circuit, and the switch sections 21a and 22a are also connected to the reserve filter circuit.

If the sensor characteristic changes while the ECU installed in one vehicle is actually used, the storage contents of the switch information storage section are changed so as to replace the processing B with the processing D, for example.

Accordingly, the switches in the switch sections 21a and 22a are switched and the input signal in the input terminal T2 is processed by the processing D different from the processing B.

Thus, the specifications of the ECU can be changed so that processing to cope with change with time, etc., can be performed not only at the simulation stage of the ECU and at the manufacturing stage at which the ECU is actually installed in a vehicle, but also after the ECU is installed in a vehicle.

Figure 6:
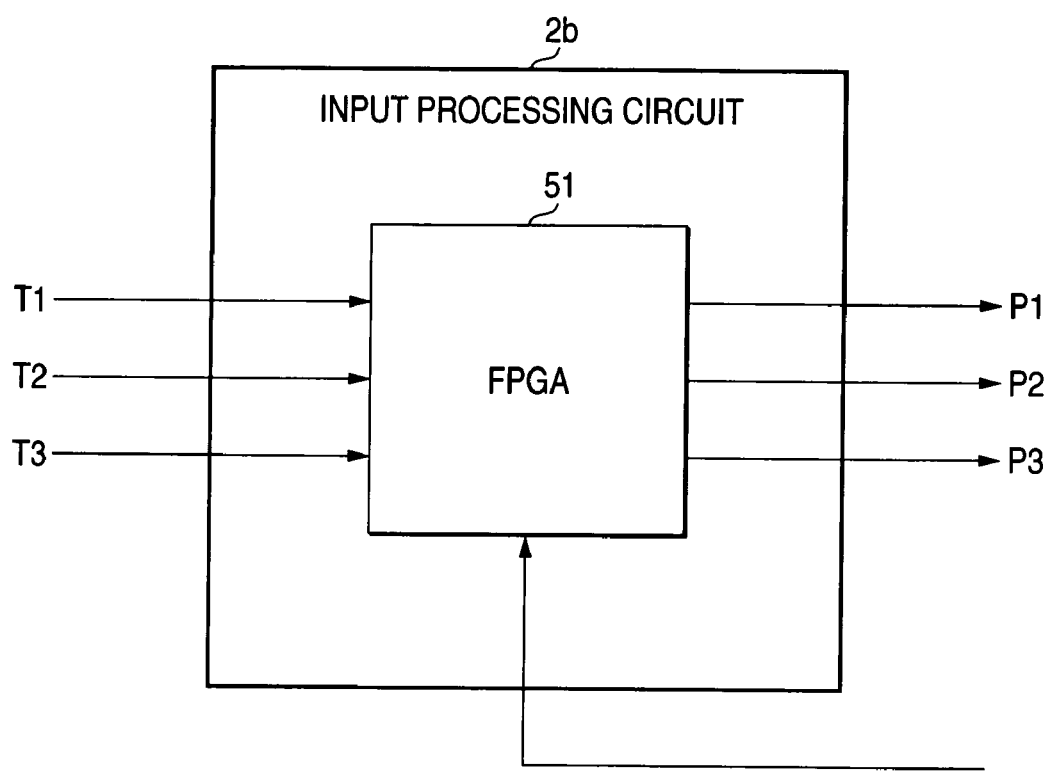
FIG. 6 is a drawing to show an example of the input processing circuit having processing sections and switch sections shown in FIG. 1 implemented as a programmable IC.

Next, another configuration example of the input processing circuit will be discussed. FIG. 6 is a drawing to show an example of the input processing circuit including processing sections and switch sections implemented as a programmable IC. In the figure, an input processing circuit 2b includes an FPGA (Field Programmable Gate Array) 51. The FPGA 51 contains circuit elements, wiring, and switches for implementing various circuit configurations by switching the switches. When the switches of the FPGA are switched by the switch control section 5, any desired processing can be executed for each input signal from the input terminal T1 to T3 and then the result can be supplied to the input port P1 to P3.

The switch control section 5 can change the connection relationship between the input terminals T1 to T3 and the input ports P1 to P3 and processing for each input signal by changing the connection state of the switches in the FPGA

51. Therefore, in the configuration, the switch information storage section 6 stores the connection state of the switches in the FPGA 51. Here, the FPGA 51 is used as a programmable IC, but any other IC, such as an FPAA (Field Programmable Analog Array), may be used so long as it is a rewritable IC.

Figure 7:
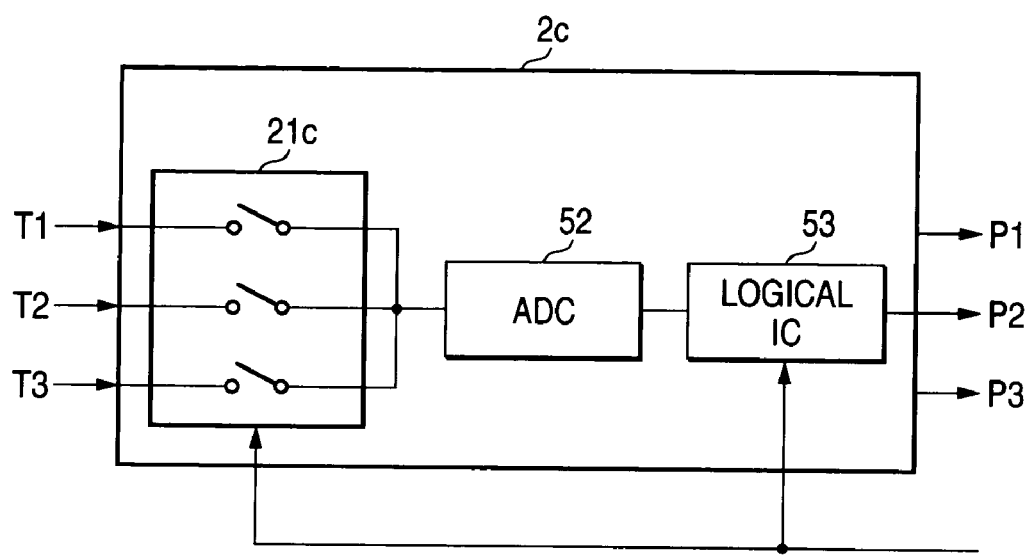
FIG. 7 is a drawing to show a configuration example of the input processing circuit using a logical IC to provide the functions of the processing sections shown in FIG. 1.

Next, a configuration example of the input processing circuit using a logical IC to provide the functions of the processing sections 23 to 25 will be discussed with reference to FIG. 7. In the figure, an input processing circuit 2c includes a switch section 21c, an analog/digital converter (ADC) 52, and a logical IC 53. The switch section 21c includes switches provided in a one-to-one correspondence with the input terminals T1 to T3 and inputs the input signal input from any one of the input terminals T1 to T3 to the ADC 52. The ADC 52 converts the input signal into a digital signal and inputs the digital signal to the logical IC 53. The logical IC 53 processes the digital signal by an internally stored program and supplies the processed signal to any one of the input ports P1 to P3.

In the input processing circuit 2c, the ADC 52 converts the input signal into a digital signal that can be processed in the logical IC 53 and the logical IC 53 processes the input signal (digital signal) and selects the input port by performing program processing. Therefore, the switch control section 5 can change the connection relationship between the input terminals and the input ports and processing for each input signal by rewriting the program of the logical IC 53. Therefore, in the configuration, the switch information storage section 6 stores the program supplies to the logical IC 53.

By the way, only one of the input terminals T1 to T3 is not necessarily used at a time and the input terminals T1 to T3 can also be used at the same time. In such a case, selectors are used as the switch sections 21, 22, 41, and 42, whereby it is made possible to use the input terminals T1 to T3 at the same time.

Figure 8:
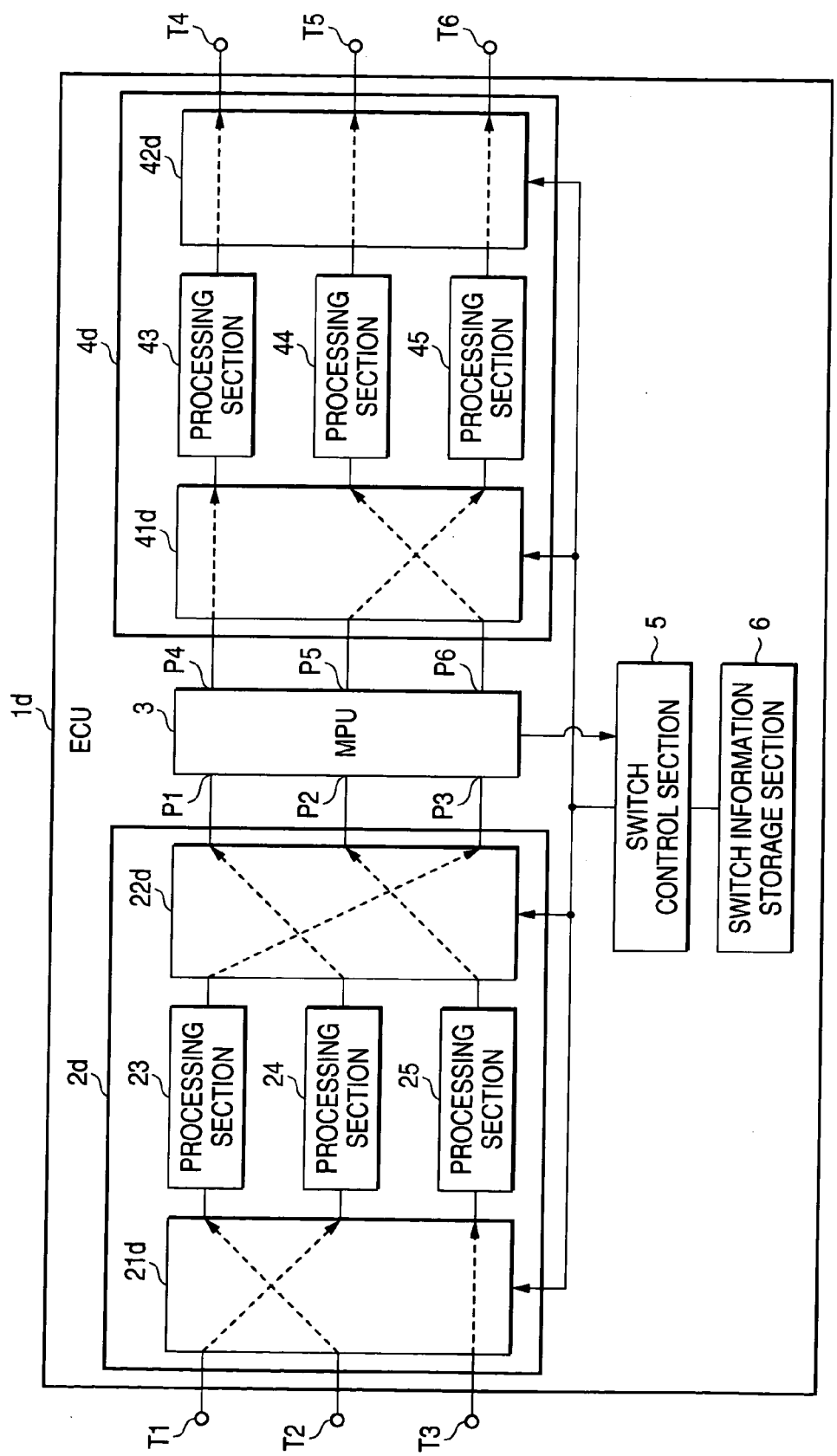
FIG. 8 is a diagram to describe the schematic configuration of an ECU using selectors as the switch sections shown in FIG. 1.

FIG. 8 is a diagram to describe the schematic configuration of an ECU 1d using selectors as the switch sections 21, 22, 41, and 42. In the figure, an input processing circuit 2d includes a selector 21d in place of the switch section 21 and a selector 22d in place of the switch section 22. Likewise, an output processing circuit 4d includes a selector 41d in place of the switch section 41 and a selector 42d in place of the switch section 42. Other components are similar to those previously described with reference to FIG. 1 and therefore are denoted by the same reference numerals in FIG. 8 and will not be discussed again.

The selector 21d connects any of the processing sections 23 to 25 to each of the input terminals T1 to T3. The selector 22d connects any of the input ports P1 to P3 to each of the processing sections 23 to 25. Therefore, the input processing circuit 2d can execute processing for the input signals input to the input terminals in parallel and supply the result to the input ports P1 to P3.

In FIG. 8, the selector 21d connects the processing section 24 to the input terminal T1, the processing section 23 to the input terminal T2, and the processing section 25 to the input terminal T3. The selector 22d connects the input port P3 to the processing section 23, the input port P1 to the processing section 24, and the input port P2 to the processing section 25.

Therefore, the input signal input from the input terminal T1 is processed by the processing section 24 and then is supplied to the input port P1. At the same time, the input signal input from the input terminal T2 is processed by the processing section 23 and then is supplied to the input port P3. The input signal input from the input terminal T3 is processed by the processing section 25 and then is supplied to the input port P2.

Likewise, the selector 41d connects any of the processing sections 43 to 45 to each of the output ports P4 to P6. The selector 42d connects any of the output terminals T4 to T6 to each of the processing sections 43 to 45. Therefore, the output processing circuit 4d can execute processing for the operation result supplied from the output ports in parallel and supply the result from the output terminals T4 to T6.

In FIG. 8, the selector 41d connects the processing section 43 to the output port P4, the processing section 45 to the output port PS, and the processing section 44 to the output port P6. The selector 42d connects the output terminal T4 to the processing section 43, the output terminal T5 to the processing section 44, and the output terminal T6 to the processing section 45.

Therefore, the operation result supplied from the output port P4 is processed by the processing section 43 and then is output from the output terminal T4. At the same time, the operation result supplied from the output port P5 is processed by the processing section 45 and then is output from the output terminal T6. The operation result supplied from the output port P6 is processed by the processing section 44 and then is output from the output terminal T5.

Thus, the selectors 21d, 22d, 41d, and 42d are used as the switch sections 21, 22, 41, and 42, whereby the input terminals, the processing sections, and the output terminals can be used at the same time for performing parallel signal processing. Therefore, if the signals input to the input terminals are replaced, for example, as the specifications of the ECU are changed, the selectors can be switched to conform to the new specifications without changing the hardware.

Figure 9:
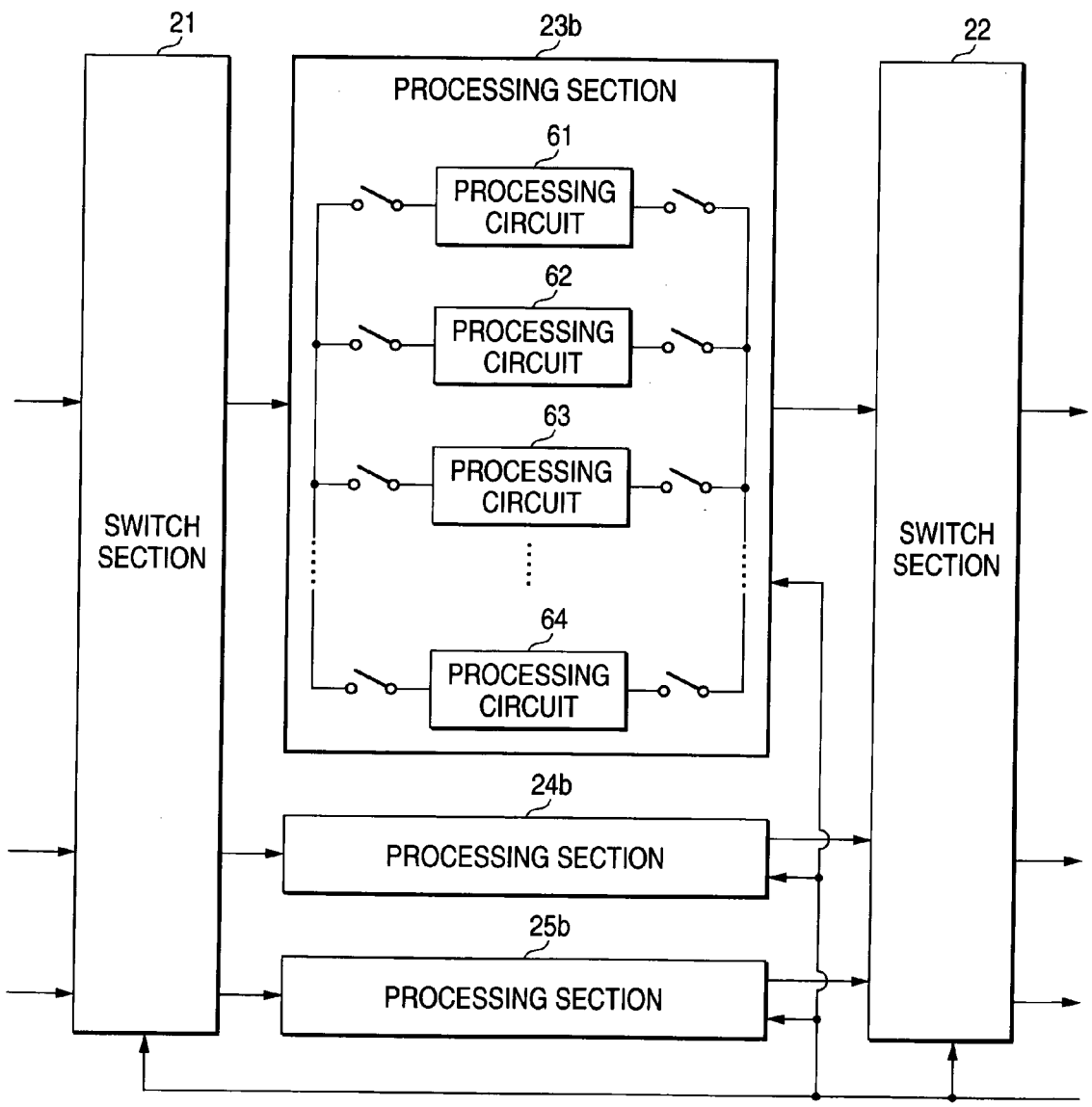
FIG. 9 is a schematic representation to describe a configuration example wherein the processing of each processing section shown in FIG. 1 can be further changed.

By the way, to assign the processing sections to the input terminals and process the input signals in parallel, it is desirable that the processing of each processing section should be able to be further changed. FIG. 9 shows a configuration example wherein the processing of each processing section can be changed. In the figure, a processing section 23b includes processing circuits 61 to 64. When any of the processing circuits 61 to 64 is selected by a switch, the processing executed by the processing section 23b can be switched.

Like the processing section 23b, each of processing sections 24b and 25b contains a plurality of processing circuits and when any of the processing circuits is selected by a switch, the processing to be executed is switched. The processing circuits in the processing section 23b, 24b, or 25b are switched in response to a switch request from the switch control section 5. Therefore, in the configuration, the switch information storage section 6 stores the processing circuit selected for each processing section as the switch information.

Thus, the processing sections are assigned to the input terminals and it is made possible to further select the processing in each processing section, so that processing can be executed for the input signals from the input terminals at the same time and the processing can be changed as desired.

On the other hand, to process the input signals from the input terminals in parallel in the ECU 1, the processing sections 23 to 25 maybe shared for performing processing in a time-sharing manner. Specifically, the switch sections 21, 22, 41, and 42 execute switch processing whenever necessary with the progress of the processing of the MPU 3, whereby the input signals from the input terminals T1 to T3 can be processed while the processing sections 23 to 25 are shared. At this time, the switch control section 5 transmits a switch request to the switch sections 21, 22, 41, and 42 upon output from the MPU 3.

Figure 10:
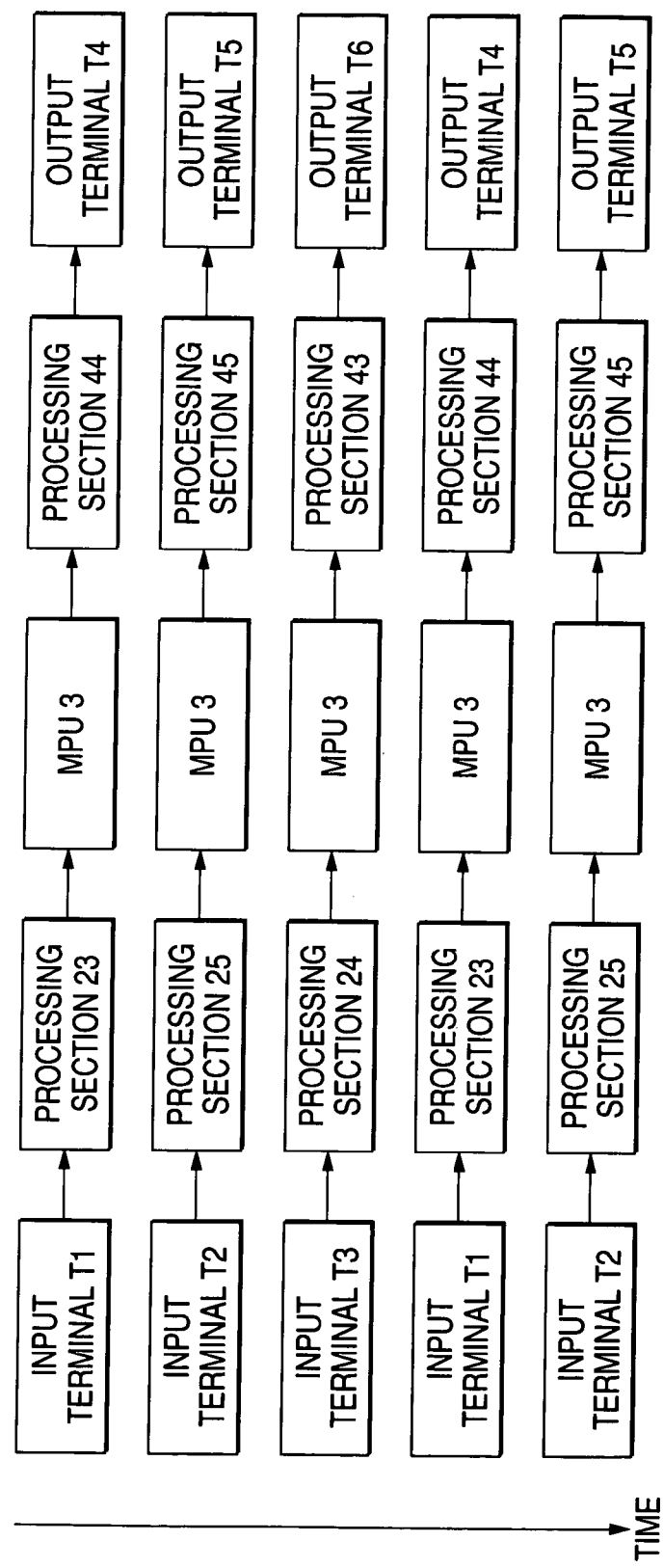
FIG. 10 is a schematic representation to describe the operation for performing processing in a time sharing manner.

FIG. 10 shows an operation example for performing processing in a time-sharing manner. As shown in the figure, in the time-shared processing, the ECU 1 first connects the input terminal T1 to the processing section 23, the processing section 23 to the MPU 3, the MPU 3 to the processing section 44, and the processing section 44 to the output terminal T4 according to the settings of the switch sections 21, 22, 41, and 42.

Next, the switch control section 5 transmits a switch request to the switch sections 21, 22, 41, and 42 for connecting the input terminal T2 to the processing section 25, the processing section 25 to the MPU 3, the MPU 3 to the processing section 45, and the processing section 45 to the output terminal T5.

Subsequently, the switch control section 5 transmits a switch request to the switch sections 21, 22, 41, and 42 for connecting the input terminal T3 to the processing section 24, the processing section 24 to the MPU 3, the MPU 3 to the processing section 43, and the processing section 43 to the output terminal T6.

Then, the switch control section 5 controls the switch sections 21, 22, 41, and 42 so as to again perform processing for the input signal from the input terminal T1. Thus, the switch control section 5 transmits switch requests to the switch sections 21, 22, 41, and 42 in sequence in response to the operation of the MPU 3, so that the ECU 1 can process inputs from the input terminals T1 to T3 in a time-sharing manner.

In FIG. 10, the input terminals T1 to T3 are in a one-to-one correspondence with the processing sections 23 to 25, but the same processing section can be shared among the input terminals in the time-shared processing. Since the processing section is thus shared among the input terminals, the circuit configuration of the whole ECU 1 can be miniaturized.

Subsequently, a use example of switching of processing for input signals will be discussed. Changing of processing for input signals can be used not only in the case where the input signal itself is changed or the specifications are changed, but also in wide range of application.

Specifically, different processing may be executed for the same input signal in response to the program executed by the MPU 3. For example, an ADC and a CMOS buffer circuit are provided as processing sections and the input signal is input through the ADC to the MPU 3 at the normal processing time and is input through the CMOS buffer circuit to the MPU 3 when an anomaly is detected. In this configuration, when detailed analog signal information of impedance measurement, etc., is required, the input signal is converted into an n-bit digital signal by the ADC and the digital signal is input to the MPU 3; when some anomaly occurs in the ECU 1, the same input signal is binarized by the CMOS buffer circuit and the signal is input to the MPU 3 and a break can be detected.

A plurality of processing sections for executing the same processing may be provided and when an anomaly occurs in the processing section, which is operating, another processing section for executing the same processing may be used to continue the processing. In this configuration, when the MPU 3 detects an anomaly of the processing section, another processing section is used as a standby circuit, so that the system stability of the ECU can be enhanced.

Next, processing of the output processing circuit 4 will be discussed. To output the operation result of the MPU 3 from the output terminal T4 to T6, processing of matching the voltage of the output signal, the drive current, etc., with those of a destination unit. The output processing circuit 4 sets processing for the operation result of the MPU 3 for each output terminal and changes the setting as required. The output processing circuit 4 can select any of the output terminals to output the processing result after executing processing for the operation result of the MPU 3.

Figure 11:
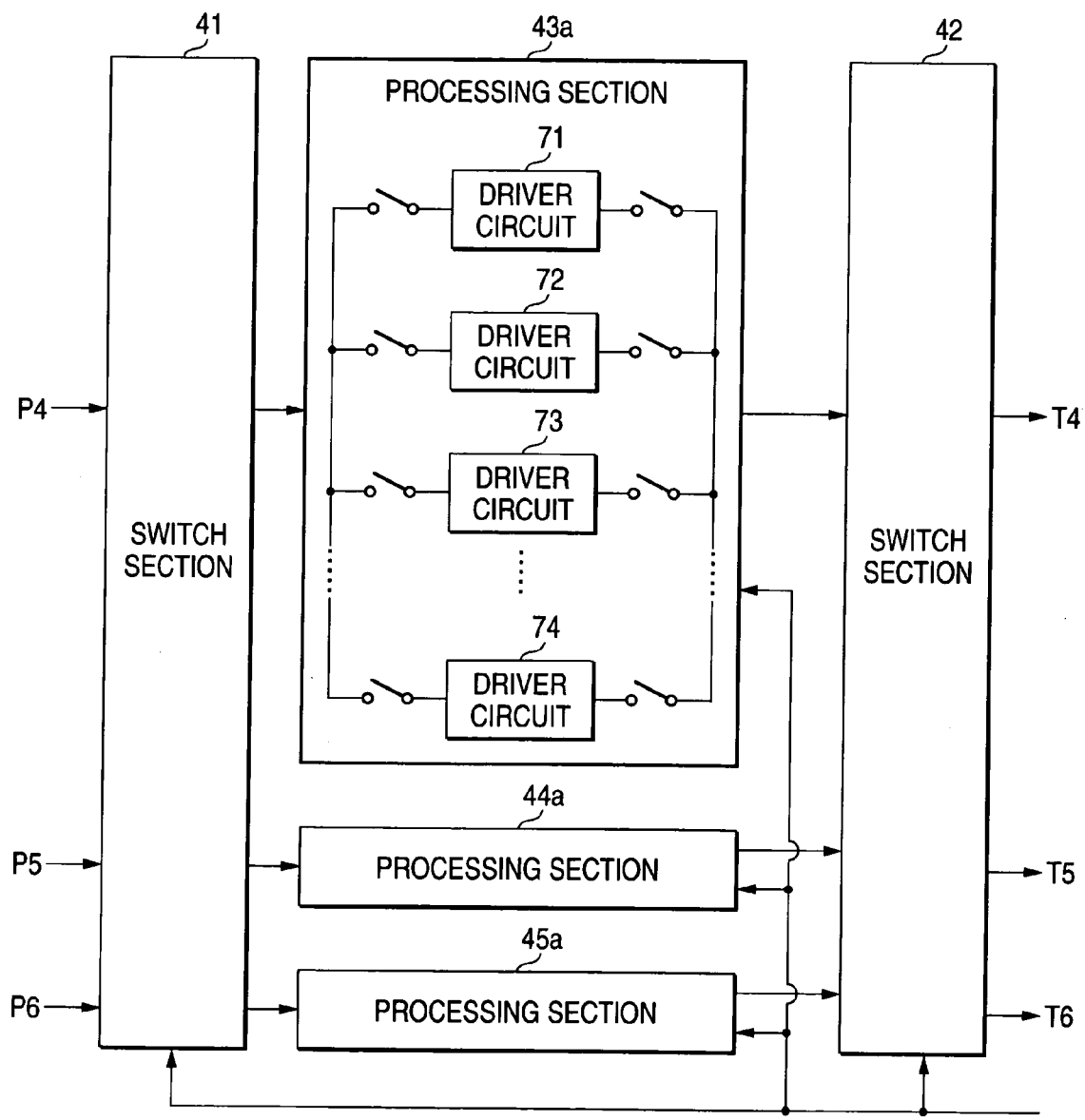
FIG. 11 is a schematic representation to describe a configuration example of an output processing circuit shown in FIG. 1.

FIG. 11 is a diagram to show an example of the configuration of the output processing circuit 4. In the figure, an output processing section 43*a* contains driver circuits 71 to 7, and switches. The driver circuits generate predetermined drive currents. Since the operation result is input to the output processing section 43*a* from any of the output ports P4 to P6 as the switch section 41 operates, the drive current for the operation result can be determined by selecting the driver circuit to be used. The operation result given the drive current by the selected driver circuit is input to the switch section 42 and is output from any of the output terminals T4 to T6 according to the setting of the switch section 42.

Here, the driver circuits 71 to 74 may be used singly or in combination. For example, assuming that the drive current generated by the driver circuit 71 is 0.1 A, that the drive current generated by the driver circuit 72 is 0.2 A, that the drive current generated by the driver circuit 73 is 0.4 A, and that the drive current generated by the driver circuit 74 is 0.8 A, the driver circuits 71 to 74 can be used in combination to generate the drive current in a range of 0.1 A to 1.5 A in steps of 0.1 A.

Specifically, if the necessary drive current is 0.2 A, the switch of the driver circuit 72 is turned on; if the necessary drive current is 1.0 A, the driver circuits 72 and 74 are turned on. If the necessary drive current is 1.5 A, the driver circuits 71 to 74 are all turned on for providing 1.5 A drive current.

Like the processing section 43*a*, each of processing sections 44*a* and 45*a* contains a plurality of driver circuits and a plurality of switches. Therefore, when the switches are switched, necessary drive current can be generated.

The switch control section 5 switches the switch sections 41 and 42 in the output processing circuit 4 and selects the driver circuits in the processing sections 43*a* to 45*a*, and the switch information storage section 6 stores the processing as the switch information.

Thus, each of the processing sections 43*a* to 45*a* contains the plurality of driver circuits and any of the processing sections 43*a* to 45*a* is assigned to the connection relationship between the output ports P4 to P6 and the output terminals T4 to T6, whereby the necessary drive current can be supplied to the operation result output from each output port and the operation result can be output from the output terminal T4 to T6.

To assign the drive current to the operation result by the output processing circuit 4, the processing section need not necessarily be assigned to each output terminal, and the driver circuit used for each output terminal may be selected from among shared driver circuits.

Figure 12:
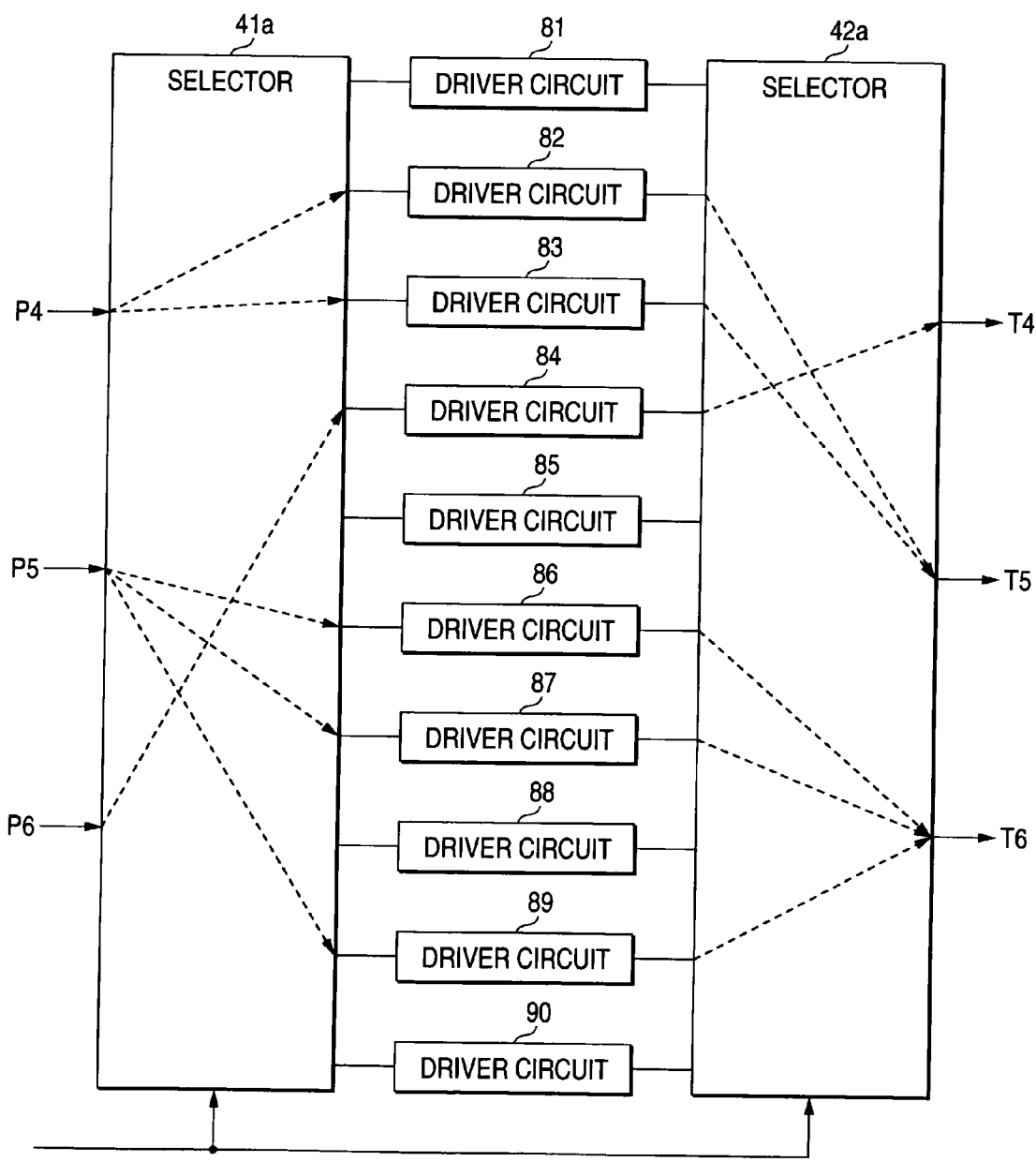
FIG. 12 is a diagram to describe the configuration of the output processing circuit for using shared driver circuits to generate the drive current for each output terminal.

FIG. 12 shows the configuration of the output processing circuit for using shared driver circuits to generate the drive current for each output terminal. In FIG. 12, selectors 41*a* and 42*a* are provided in place of the switch sections 41 and 42 and driver circuits 81 to 90 are provided in place of the processing sections 43 to 45.

The selector 41*a* is controlled by the switch control section 5 for switching the connection relationship between the output ports P4 to P6 and the driver circuits 81 to 90. The selector 42*a* is controlled by the switch control section 5 for switching the connection relationship between the driver circuits 81 to 90 and the output terminals T4 to T6. Since the driver circuits 81 to 90 generate predetermined drive currents, any desired drive current can be given to the operation result output from each output port when the selectors 41a and 42a are switched.

Specifically, in FIG. 12, the driver circuits 82 and 83 are connected to the output port P4 for outputting the operation result from the output terminal T5. The driver circuits 86, 87, and 89 are connected to the output port P5 for outputting the operation result from the output terminal T6. Further, the driver circuit 84 is connected to the output port P6 for outputting the operation result from the output terminal T4.

Thus, the plurality of driver circuits are shared and the shared driver circuits are used in combination to generate the drive current for each output terminal, so that the necessary current for each output terminal can be supplied while the number of the driver circuits is suppressed.

Here, the drive currents of the driver circuits 81 to 90 are set to 0.1 A, 0.2 A, 0.4 A, and 0.8 A in twice step manner, so that the number of the types of drive currents that can be supplied to the output terminal using the driver circuits in combination can be increased. Here, the drive current needs to be supplied to a plurality of input terminals and thus preferably a plurality of driver circuits having the same drive current are provided.

As described above, in the first embodiment, the switch control section 5 can switch the connection state of the switch sections 21, 22, 41, and 42 based on the switch information stored in the switch information storage section 6 to change the processing for the input signal and the processing for the operation result of the MPU 3.

Also, the connection relationship between the input terminals T1 to T3 and the input ports P1 to P3 of the MPU 3 can be set as desired, for making it possible to separately select the processing to be executed for the input signal input from each input terminal.

Further, the switch control section 5 switches the connection relationships among the input terminals T1 to T3, the processing sections 23 to 25, the MPU 3, the processing sections 43 to 45, and the output terminals T4 to T6 in sequence in response to the processing state of the MPU 3 to perform time-shared processing, so that the processing sections 23 to can be shared among the input terminals, the processing sections 43 to 45 can be shared among the output terminals, and the ECU 1 can be miniaturized.

Also, for the same input signal, a plurality of processings may be switched, so that the processing for the input signal can be switched in response to the processing of the MPU 3.

Further, in the configuration in which a plurality of processing sections for executing the same processing are provided, when an anomaly occurs in the processing section which is operating, another processing section can be used as a standby circuit, so that the system stability of the ECU can be enhanced.

Also, the connection relationship between the output ports P4 to P6 of the MPU 3 and the output terminals T4 to T6 can be set as desired for separately selecting the processing to be executed for the operation result output from each output port.

Further, a plurality of driver circuits are shared among the output terminals T4 to T6 and the shared driver circuits are used in combination to generate the drive current to be supplied to each output terminal, so that the number of the driver circuits is suppressed and the ECU 1 can be miniaturized.

Thus, according to the vehicle-installed ECU in the embodiment, for example, to install the ECU in a vehicle or repair the ECU after the development is complete, the hardware configuration can also be changed as required and the time and the cost accompanying specification change can be drastically decreased. In addition, if different specifications are required because of the difference in the vehicle type or the difference in the country where the ECU is to be used, it is made possible to use the same ECU, so that the manufacturing cost can be reduced.

(Second Embodiment)

In the first embodiment, the ECU whose processing can be changed as required has been described. In a second embodiment of the invention, a vehicle-installed ECU wherein the authority to change processing is set and whether or not changing the processing is permitted is determined based on the authority will be discussed as an application example of the ECU in the first embodiment.

Figure 13:
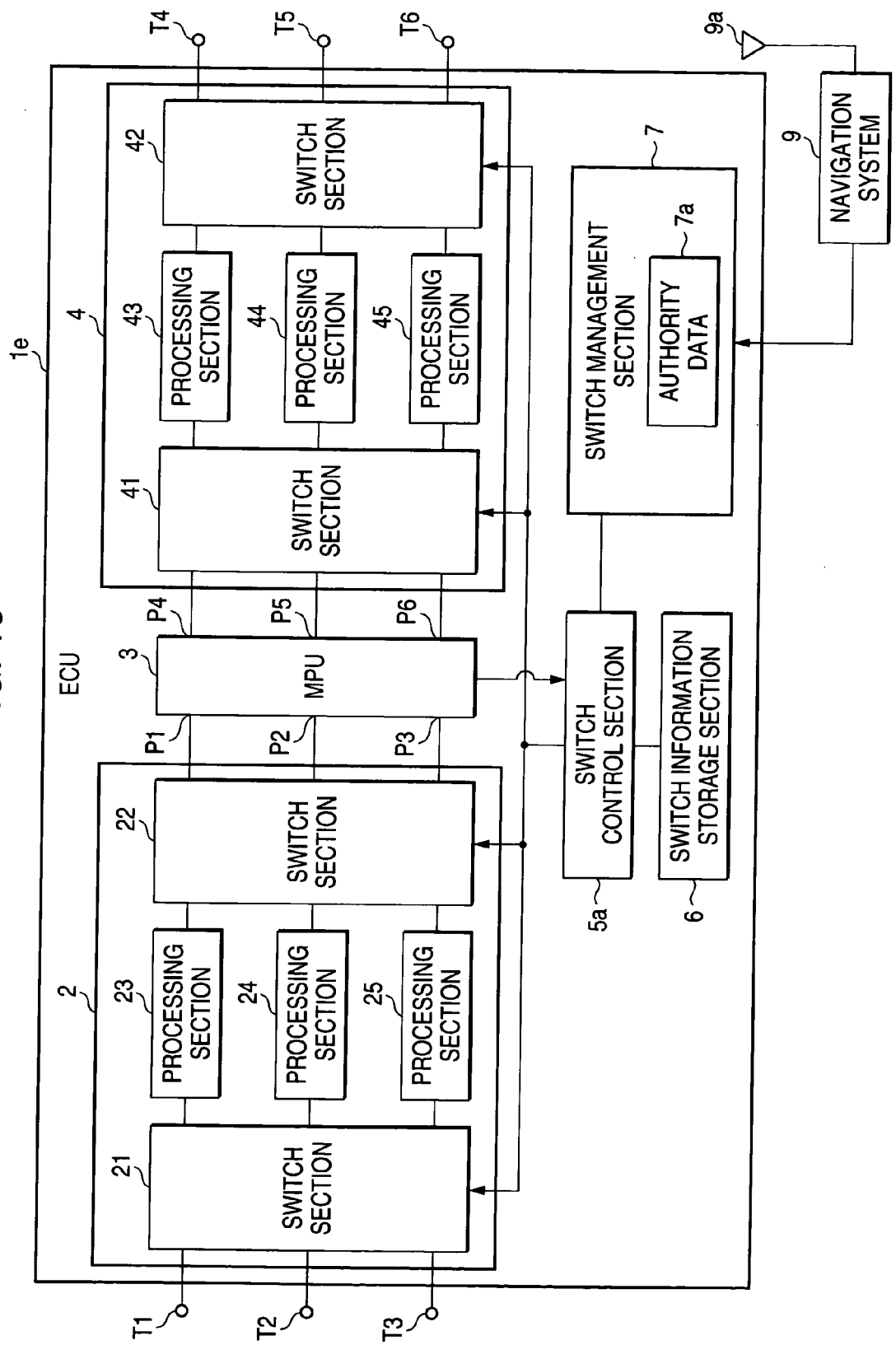
FIG. 13 is a schematic representation to describe the schematic configuration of an ECU according to a second embodiment of the invention.

FIG. 13 is a schematic representation to describe the schematic configuration of a vehicle-installed ECU according to the second embodiment of the invention. In FIG. 13, an ECU 1e includes a switch management section 7. Also, a switch control section 5a contained in the ECU 1e is connected to the switch management section 7. Other components and operation are similar to those of the ECU 1 of the first embodiment previously described and therefore are denoted by the same reference numerals in FIG. 13 and will not be discussed again.

The switch management section 7 contains authority data 7a. The authority data 7a is data setting the request authority for the switching of the processing of the input processing circuit 2 and the processing of an output processing circuit 4. When the switch control section 5a transmits a switch request to the input processing circuit 2 or the output processing circuit 4, the switch management section 7 references the authority data 7a and determines whether or not execution of the switch request is permitted.

FIG. 14 shows a specific example of the authority data 7a. In the figure, authority level 1 or higher is required for processing A and processing D, and authority level 2 is required for processing B and processing C. That is, all types of processing can be switched at authority level 2, but processing B and processing C cannot be switched at authority level 1 and processing cannot be switched at authority level 0.

Here, processing A to processing D are processing accomplished by processing sections of the input processing circuit 2 or the output processing circuit 4. To set the authority level, for example, authority level 2 may be given to the developing factory of the ECU and authority level 1 may be given to a vehicle factory.

In setting so, all types of processing can be switched in the developing factory of the ECU, some processing which needs to be switched in response to the state of the vehicle can be switched in the vehicle factory, and the user, etc., having authority level 0, namely, no authority level are prohibited from switching processing.

In a case of executing the switch of the processing, as a method of notifying the switch management section 7 of the authority level, a request for inputting an identification signal may be made before switching is executed, for example. In this configuration, the switch management section 7 makes a comparison between the identification signal and the authority data 7a, thereby determining whether or not execution of the switch of the processing is permitted.

The authority level may be added to the signal for making a request for switching to notify the switch management section 7 of the authority level. In this configuration, when a switch request occurs, the switch management section 7 checks whether or not the data contains authority information, and permits switch processing only if the data contains authority information satisfying the request authority.

Further, the switch management section 7 can determine whether or not execution of the switch of the processing is permitted based on position information. The switch management section 7 acquires position information from a navigation system 9 outside the ECU 1e through a position information acquisition section (not shown). The navigation system 9 can create position information using a GPS antenna 9a.

The switch management section 7 determines whether or not the switch of the processing is permitted based on whether or not the acquired position information matches a predetermined position previously registered. That is, the positions of the vehicle manufacturing factory and body shop are previously registered and if the acquired position information matches the registered position of the vehicle manufacturing factory or body shop, the switch of the processing is permitted, whereby the switch of the processing is permitted only in the manufacturing factory and body shop and can be prohibited at any other place.

As described above, in the ECU 1e according to the second embodiment, authority to change processing is set and is stored as the authority data 7a and the switch management section 7 determines whether or not the switch of the processing is permitted based on the authority data 7a, so that unauthorized change or erroneous change of processing can be prevented.

Further, position information is acquired and whether or not the switch of the processing is permitted based on whether or not the acquired position information matches the previously registered position information, so that the switch of the processing can be permitted only in specific locations of the factory, etc.

Particularly, in recent years, often a navigation system has been installed in a vehicle, and full use of the position information created by the navigation system can be made for accomplishing switch management of processing.

In the description of the second embodiment, request authority is set in switch control in the input processing circuit 2 and the output processing circuit 4; similar request authority can also be used in changing the software of the MPU 3. The determination as to whether or not rewrite is permitted using the position information can also be used for determining whether or not rewrite of the software of the MPU 3 is permitted.

(Third Embodiment)

In the first embodiment, the ECU whose processing can be changed as required has been described. In the second embodiment, setting of authority to change processing has been described. In a third embodiment of the invention, various modifications and application examples of ECU whose processing can be changed will be discussed.

Figure 15:
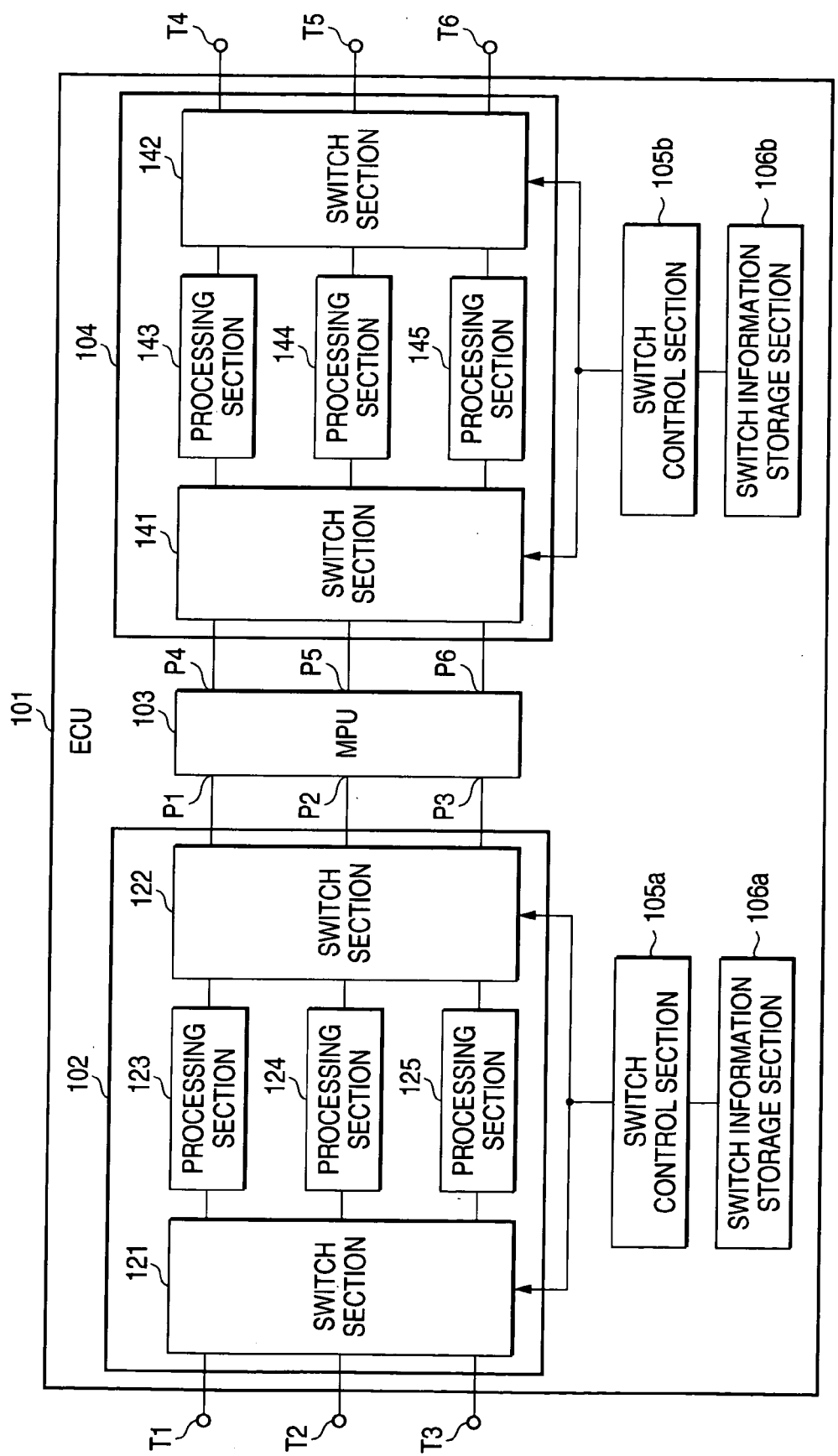
FIG. 15 is a schematic representation to describe an ECU provided with a switch control section for switching processing of an input processing circuit and a switch control section for switching processing of an output processing circuit, separately.

FIG. 15 is a diagram to show an ECU including a switch control section for switching processing of an input processing circuit and a switch control section for switching processing of an output processing circuit, separately. In the figure, an ECU 101 includes input terminals T1 to T3, an input processing circuit 102, an MPU 103, an output processing circuit 104, output terminals T4 to T6, switch control sections 105a and 105b, and switch information storage sections 106a and 106b.

Further, the input processing circuit 102 contains a switch section 121, processing sections 123 to 125, and a switch section 122. The processing sections 123 to 125 have functions of executing predetermined processing for an input signal, and the switch section 121 switches the connection relationships between the input terminals T1 to T3 and the processing sections 123 to 125. The switch section 122 switches the connection relationships between the processing sections 123 to 125 and input ports P1 to P3 of the MPU 103.

Therefore, the input signal input from the input terminal T1 to T3 is processed by any of the processing sections 123 to 125 and then is input to any of the input ports P1 to P3. The connection relationships among the input terminals T1 to T3, the processing sections 123 to 125, and the input ports P1 to P3 are switched by the switch sections 121 and 122, whereby processing for the input signal can be set and which port of the MPU 103 the processed input signal is input to can be set as desired.

The switch control section 105a transmits a switch request to the switch sections 121 and 122 for changing the connection relationships among the input terminals T1 to T3, the processing sections 123 to 125, and the input ports P1 to P3. The switch information storage section 106a stores switch information associating the connection relationships among the terminals, the ports, and the processing sections with the settings of the switch sections 121 and 122. The switch control section 105a can transmit a switch request to the switch sections 121 and 122 based on the switch information stored in the switch information storage section 106a, for changing the settings of the switch sections 121 and 122 so as to realize any desired connection relationships.

The MPU 103, which contains a processor and memory, performs operations on the input signal from the input port P1 to P3 based on an internally stored program and outputs the operation result from output ports P4 to P6. Here, the operation processing is performed by the MPU, but an ASIC, etc., may be used so long as it can execute a desired operation processing.

The output processing circuit 104 includes a switch section 141, processing sections 143 to 145, and a switch section 142. The processing sections 143 to 145 have functions of executing predetermined processing for the operation result of the MPU 103, and the switch section 141 switches the connection relationships between the output ports P4 to P6 and the processing sections 143 to 145. Also, the switch section 142 switches the connection relationships between the processing sections 143 to 145 and the output terminals T1 to T3.

Therefore, the operation result output from the output port P4 to P6 is processed by any of the processing sections 143 to 145 and then is output from any of the output terminals T4 to T6. The connection relationships among the output ports P4 to P6, the processing sections 143 to 145, and the output terminals T4 to T6 are switched by the switch sections 141 and 142, whereby processing for the operation result of the MPU 103 can be set and which terminal the processed operation result is output from can be set as desired.

The switch control section 105b transmits a switch request to the switch sections 141 and 142 for changing the connection relationships among the output ports P4 to P6, the processing sections 143 to 145, and the output terminals T4 to T6. The switch information storage section 106b stores switch information associating the connection relationships among the terminals, the ports, and the processing sections with the settings of the switch sections 141 and 142. The switch control section 105*b* can transmit a switch request to the switch sections 141 and 142 based on the switch information stored in the switch information storage section 106*b* for changing the settings of the switch sections 141 and 142 so as to realize desired connection relationships.

Further, the switch information stored in the switch information storage section 106*b* can be rewritten for changing the correspondence between the connection relationships among the terminals, the ports, and the processing sections and the settings of the switch sections.

Thus, even in the configuration wherein the switch control section 105*a* for controlling the connection relationship of the input processing circuit 102 and the switch control section 105*b* for controlling the connection relationship of the output processing circuit 104 are provided separately, the ECU for providing similar advantages to those of the ECU shown in the first embodiment can be provided.

Figure 16:
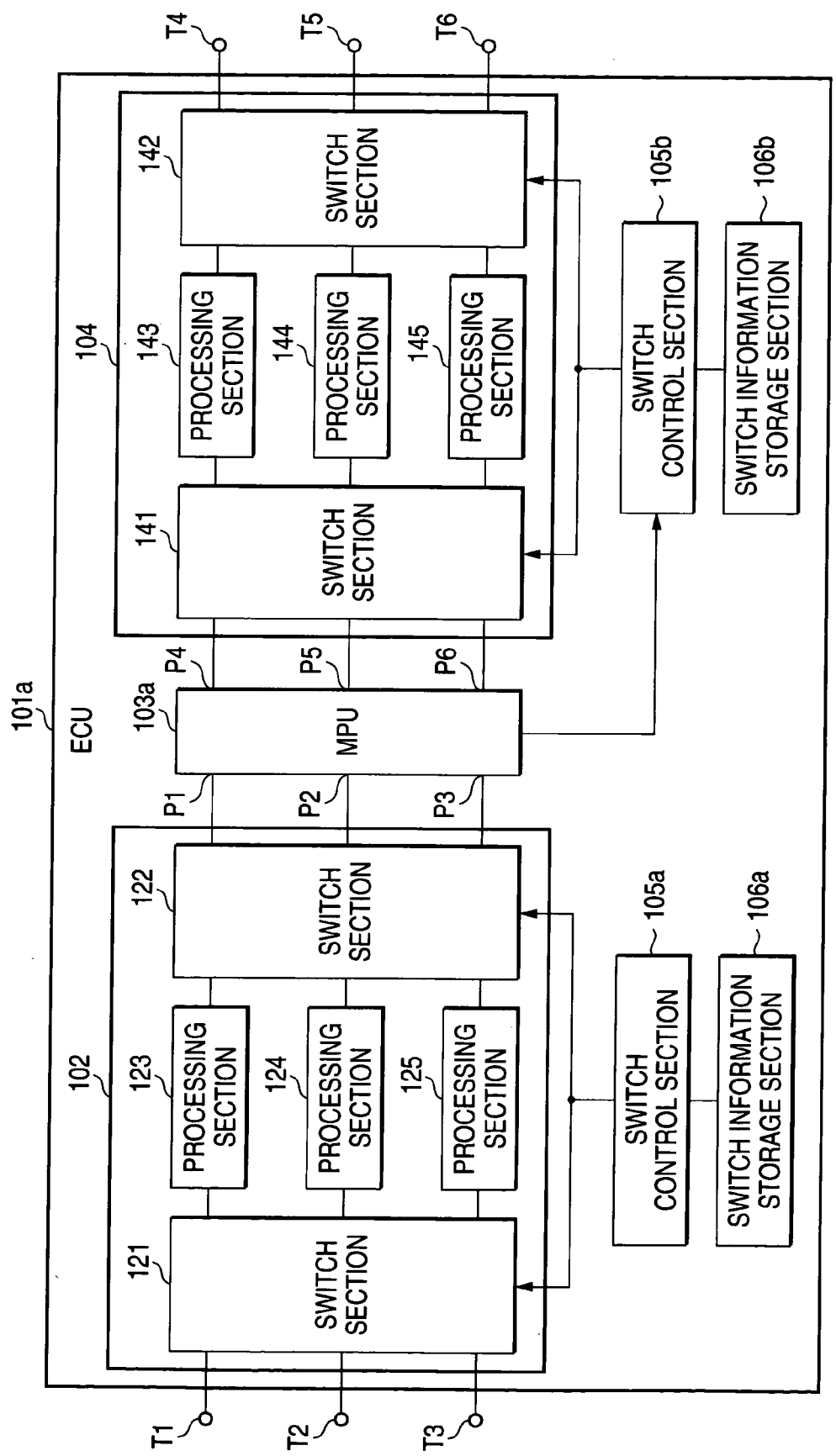
FIG. 16 is a block diagram to show the configuration of an ECU for controlling the output processing circuit based on a calculation result of an MPU.

In the case of providing separate switch control sections and separate switch information storage sections, it is desirable that the switch control section for determining the processing of the output processing circuit should control the processing based on the operation result of the MPU to give appropriate drive current to the operation result of the MPU. FIG. 16 shows a configuration example of an ECU for controlling the output processing circuit based on the operation result of the MPU.

In an ECU 101*a* shown in FIG. 16, an MPU 103*a* transmits the description of appropriate output processing for the operation result to the switch control section 105*b*. The switch control section 105*b* reads from the switch information storage section 106*b* the connection state of the switch sections 141 and 142 required for accomplishing the processing description received from the MPU 103*a*, and controls the switch sections 141 and 142.

Thus, since the description of output processing required for the operation result of the MPU is transmitted to the switch control section 105*b*, if management of the processing of the input processing circuit and management of the processing of the output processing circuit are conducted separately, appropriate output processing can be executed for the operation result of each input signal.

Figure 17:
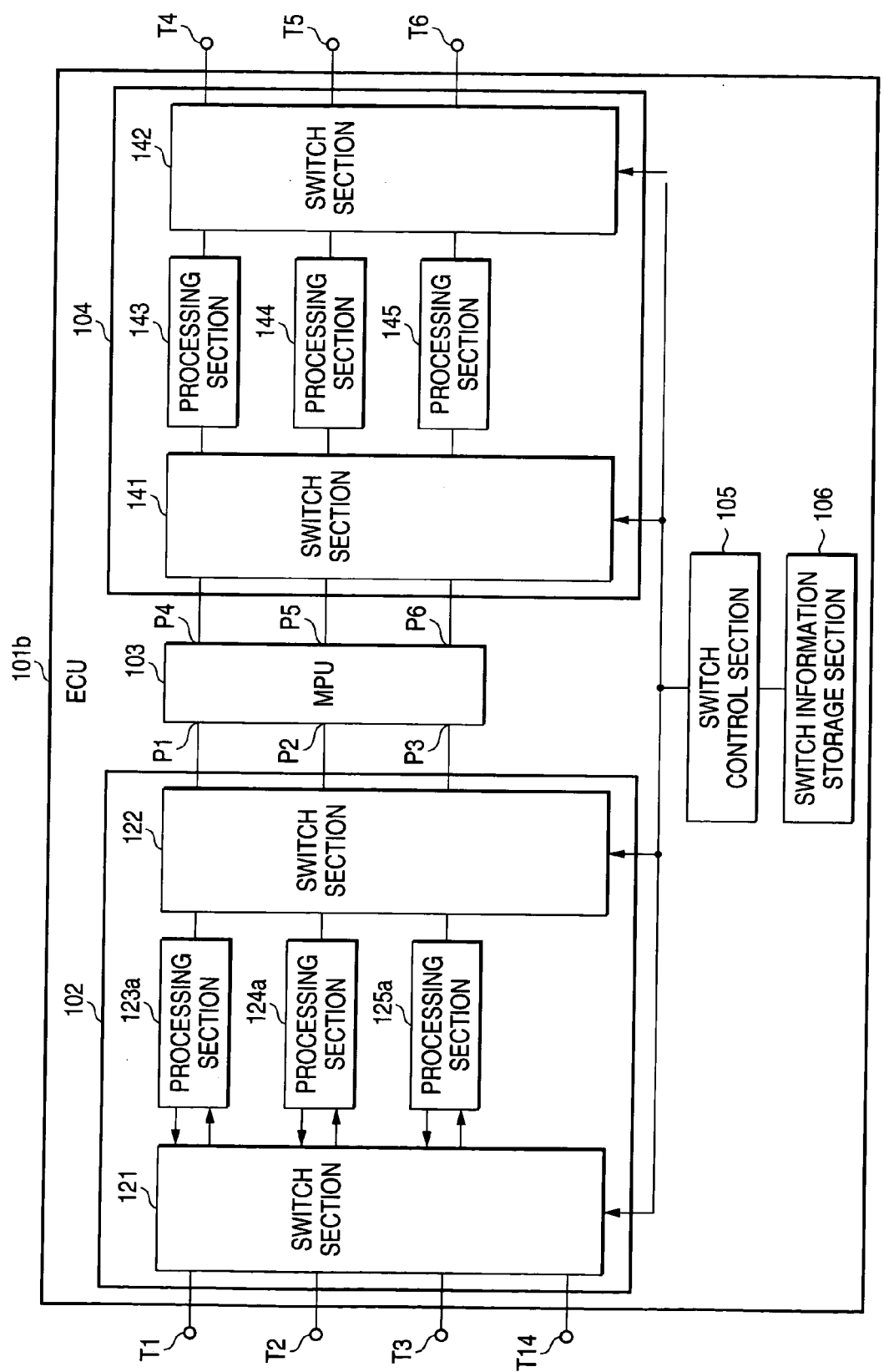
FIG. 17 is a block diagram to show the configuration of an ECU for determining the processing for an input signal using a plurality of processing sections in combination.

Next, a configuration example of an input processing circuit will be discussed. FIG. 17 is a block diagram to show the configuration of an ECU for determining the processing for an input signal using a plurality of processing sections in combination. In an ECU 101*b* shown in FIG. 17, processing sections 123*a*, 124*a*, and 125*a* are connected to a switch section 121 bidirectionally. Other components are similar to those of the ECU previously described and therefore are denoted by the same reference numerals and will not be discussed again.

Since each of the processing sections 123*a*, 124*a*, and 125*a* is connected to the switch section 121 bidirectionally, the connection state of the switch section 121 can be selected to use the plurality of processing sections in combination for a single input signal.

Figure 18:
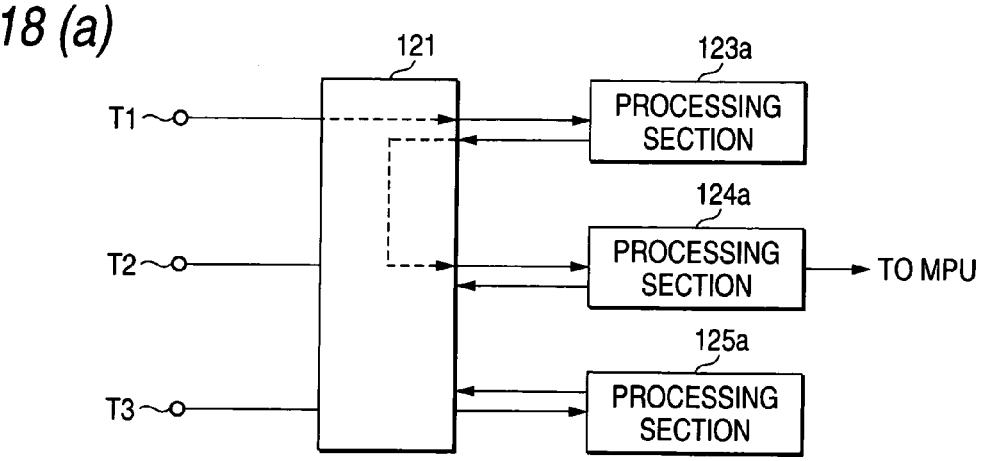
FIG. 18 is schematic representations to describe the operation of the ECU shown in FIG. 17.
Figure 18:
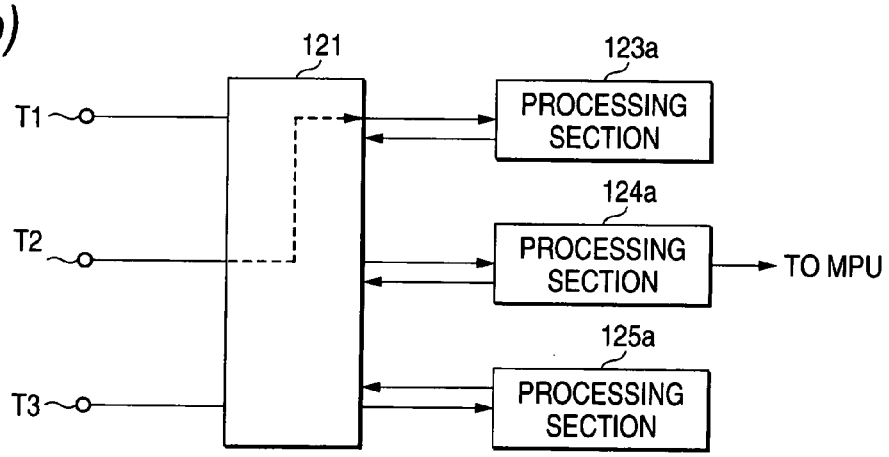
Figure 18:
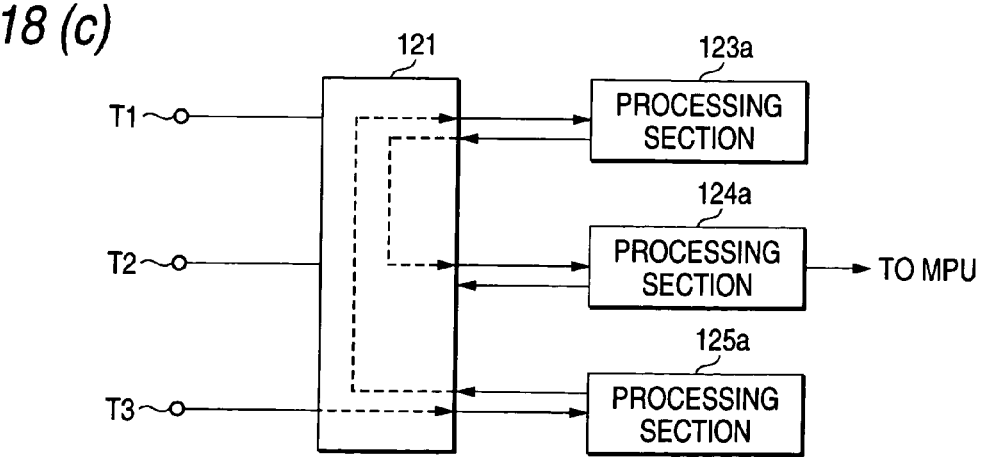

FIG. 18 shows connection examples of the switch section 121. As shown in the figure, the switch section 121 first allows the processing section 123*a* to process the input signal input from an input terminal T1 and then allows the processing section 124*a* to process the signal and transmit the processed signal to an MPU. On the other hand, the switch section 121 allows the processing section 123*a* to process the input signal input from an input terminal T2 and then transmit the processed signal to the MPU.

Further, the switch section 121 first allows the processing section 125*a* to process the input signal input from an input terminal T3, next allows the processing section 123*a* to process the signal, and then allows the processing section 124*a* to process the signal and transmit the processed signal to the MPU.

In the embodiments described so far, the processing circuits are selected for each of three input signals. A case where a fourth input signal is newly added because of specification change will be discussed. It is assumed that the ECU includes four input terminals at the manufacturing time (T1 to T3 plus T14 as a reserve terminal).

The processing sections can be connected to input signals, namely, the input terminals in common. That is, the processing section 123*a*, 124*a*, 125*a* can be connected to any of the input terminal T1, T2, T3, or T14 and the input signal input through any of the input terminal T1, T2, T3, or T14 can be input to the processing section 123*a*, 124*a*, 125*a*.

In a case of inputting a fourth input signal to the input terminal T14, sequence information in the switch information storage section 106 is previously changed. Then, the switch control section 105 selects, for example, the processing section 123*a* from among the processing sections 123*a*, 124*a*, and 125*a* for the input signal according to the previously changed sequence information, and switches the switch section 121 for connecting the input terminal T14 and the processing section 123*a*. Accordingly, the fourth input signal is input through the input terminal T14 and the switch section 121 to the processing section 123*a*.

For example, selection means may include the switch section, the switch control section, and the switch information storage section or may include only the switch section and the switch control section and the switch information storage section may be provided outside the ECU. The selection means may include the switch section and the switch control section and the switch information storage section may be provided outside the ECU. In any case, it may be made possible for a predetermined processing circuit to selectively perform processing for the input signal.

The description may be applied not only to the input processing circuit, but also to an output processing circuit, of course. In this case, for the input signal for the output processing circuit, an output signal processed by the MPU is adopted.

Figure 19:
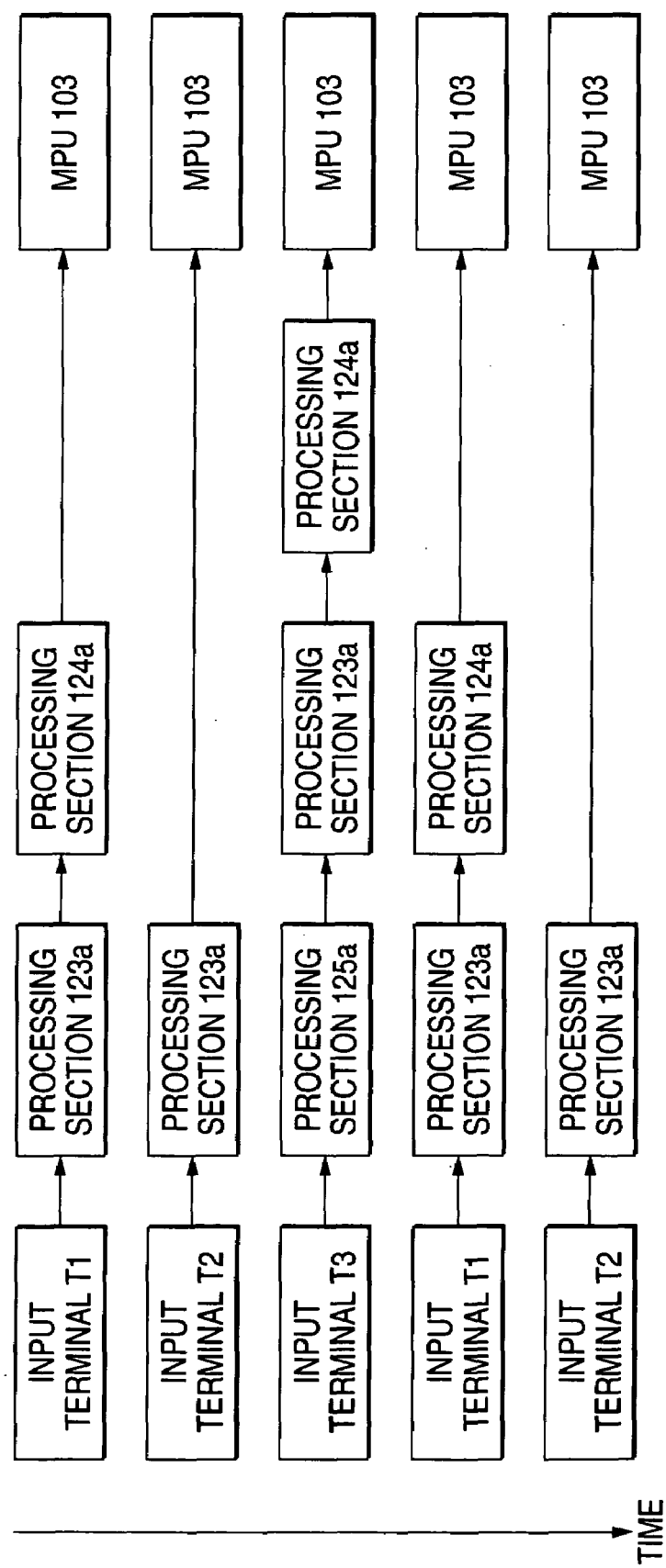
FIG. 19 is a schematic representation to describe time-shared processing in an input processing circuit shown in FIG. 17.

Thus, to use a plurality of processing sections in combination, each processing section is shared among the input terminals. Then, it is desirable that time-shared processing should be performed to process signals input from a plurality of input terminals in parallel. FIG. 19 is a schematic representation to describe time-shared processing in the input processing circuit 102.

As shown in FIG. 19, to process the input signal input from the input terminal T1, the input terminal T1 and the processing section 123*a* are connected, the processing sections 123*a* and 124*a* are connected, and the processing section 124*a* and the MPU 103 are connected. Next, to process the input signal input from the input terminal T2, the input terminal T2 and the processing section 123*a* are connected and the processing section 123*a* and the MPU 103 are connected.

Further, to process the input signal input from the input terminal T3, the input terminal T3 and the processing section 125*a* are connected, the processing sections 125*a* and 123*a* are connected, the processing sections 123*a* and 124*a* are connected, and the processing section 124*a* and the MPU 103 are connected.

Then, to again process the input signal input from the input terminal T1, the input terminal T1 and the processing section 123*a* are connected, the processing sections 123*a* and 124a are connected, and the processing section 124a and the MPU 103 are connected. To process the input signal input from the input terminal T2, the input terminal T2 and the processing section 123a are connected and the processing section 123a and the MPU 103 are connected.

Therefore, even if different signals are input to the input terminals T1 to T3, the signals can be processed in parallel. If a new input signal is added to T14 as described above, time-shared processing may be performed as shown in FIG. 19. FIG. 20(a) shows a specific example of the parallel processing. In FIG. 20(a), a signal from a first rotation sensor is input to the input terminal T1, a signal from a water temperature sensor is input to the terminal T2, and a signal from a second rotation sensor is input to the input terminal T3.

Further, in FIG. 20(a), a low-pass filter is used as the processing section 123a, a comparator is used as the processing section 124a, and an offset correction circuit is used as the processing section 125a. Then, the signal from the first rotation sensor can be transmitted through the low-pass filter and the comparator to the MPU; the signal from the water temperature sensor can be transmitted through the low-pass filter to the MPU; and the signal from the second rotation sensor can be subjected to offset correction and then be transmitted through the low-pass filter and the comparator to the MPU.

By the way, changing of processing using the processing sections in combination is not necessarily limited for each input terminal. For example, the combination of the processing sections maybe changed depending on the substance of the signal input from the same input terminal.

FIG. 20(b) is a schematic representation to describe changing the combination of the processing sections in response to input from the same input terminal. In FIG. 20(b), first the signal from the first rotation sensor input to the input terminal T1 is transmitted through the low-pass filter and the first comparator to the MPU. Therefore, the comparison result of the number of revolutions output by the first rotation sensor, provided by the first comparator is transmitted to the MPU.

The MPU uses the comparison result to execute operation processing. However, if the number of revolutions changes and it becomes impossible to obtain an appropriate value in the comparison of the first comparator, the MPU switches the combination of the processing sections to connect the low-pass filter and a second comparator to the input terminal T1. Thus, since the combination of the processing sections connected to the input terminal T1 is changed in response to the output value of the first rotation sensor, if the number of revolutions changes, appropriate processing can be performed.

Since various input signals can be thus handled by changing the combination of the processing sections, for example, if an unimaginable signal is input to one input terminal, the signal can be handled using the existing processing sections in combination and the flexibility in changing the configuration of the ECU is enhanced dramatically.

Figure 21:
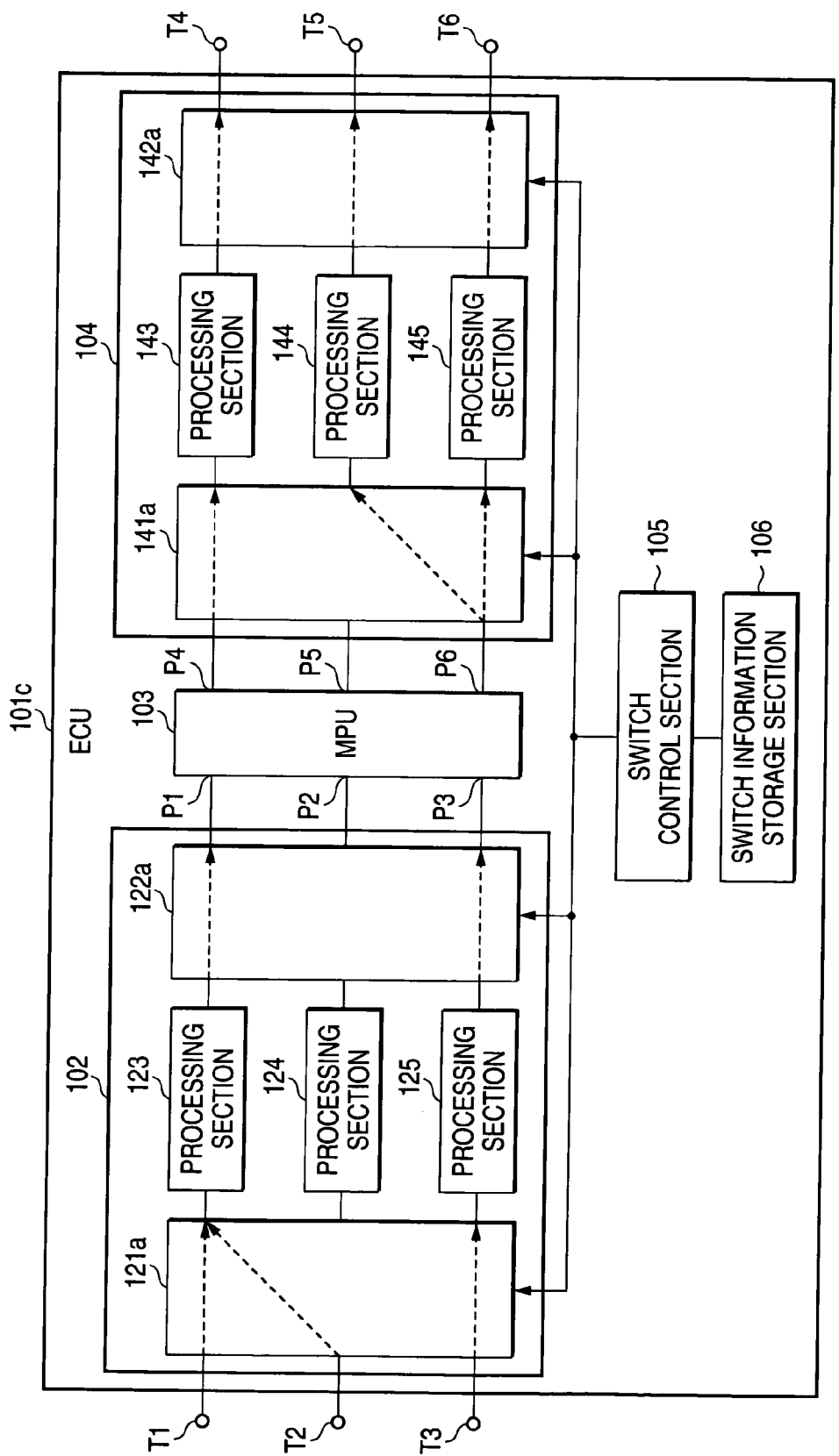
FIG. 21 is a schematic representation to describe processing sections for executing processing based on signals from a plurality of input/output terminals.

Next, a configuration example of input processing circuit and output processing circuit will be discussed. In an ECU 101c shown in FIG. 21, a switch section 121a in the input processing circuit 102 inputs a signal input from the input terminal T1 and a signal input from the input terminal T2 to the processing section 123. Therefore, the processing section 123 executes processing based on the two input signals and transmits the processing result to the MPU 103.

On the other hand, the switch section 121a transmits a signal input from the input terminal T3 to the processing section 125, which then executes processing based on the single input signal and transmits the processing result to the MPU 103.

Further, the signal output from the output port P4 of the MPU 103 is processed by the processing section 143 and is output from the output terminal T4; the signal output from the output port P6 of the MPU 103 is input to the processing sections 144 and 145, which then process the signal. The processing result of the processing section 144 is output from the output terminal T5 and the processing result of the processing section 145 is output from the output terminal T6.

In this manner, the processing sections contained in the input processing circuit and the output processing circuit need not necessarily be in a one-to-one correspondence with the input/output terminals or the input/output ports; the processing section may execute processing based on the signals from a plurality of input/output terminals or a plurality of processing sections may process the signal from a single input/output terminal.

Next, the configuration of the MPU 103, the switch control section 105, and the switch information storage section 106 will be discussed. The MPU 103, the switch control section 105, and the switch information storage section 106 may be implemented as separate processing means; the MPU 103, the switch control section 105, and the switch information storage section 106 may be provided in a single microcomputer as in an ECU 101d shown in FIG. 22.

Figure 22:
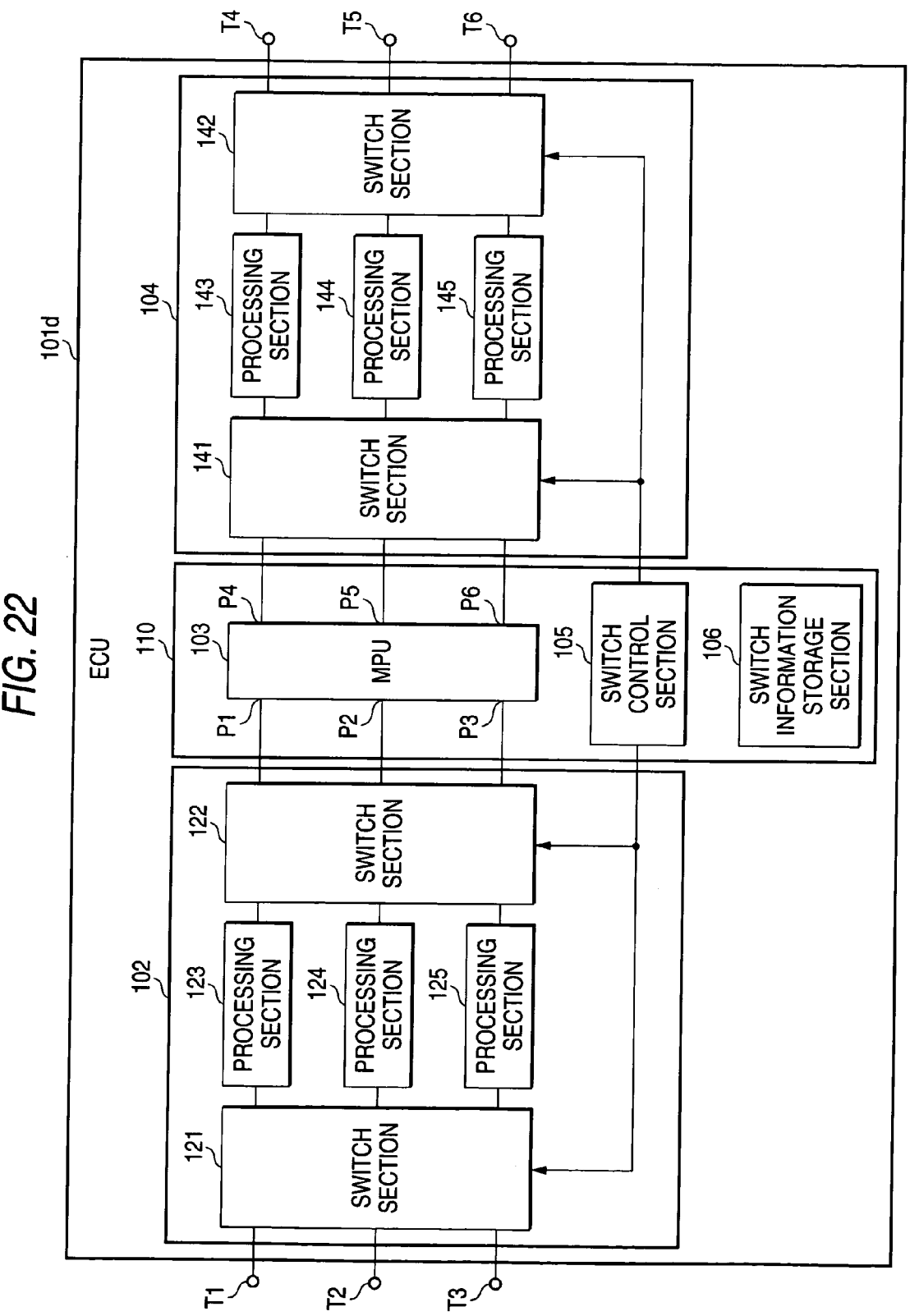
FIG. 22 is a schematic representation to describe an ECU including an MPU, a switch control section, and a switch information storage section provided in a single microcomputer.

In the ECU 101d shown in FIG. 22, the MPU 103, the switch control section 105, and the switch information storage section 106 may be provided in a microcomputer 110. When they are thus provided in the same microcomputer, the internal configuration of the ECU can be simplified and the manufacturing cost can be reduced.

The MPU 103 and the switch control section 105 need not be provided separately in the microcomputer 110; for example, switch control of the switch control section 105 may be assigned to the MPU 103.

Further, the switch control section 105 and the switch information storage section 106 need not necessarily be provided in the ECU and a switch request sent to the switch sections 121, 122, 141, and 142 may be received from an external switch control section.

Figure 23:
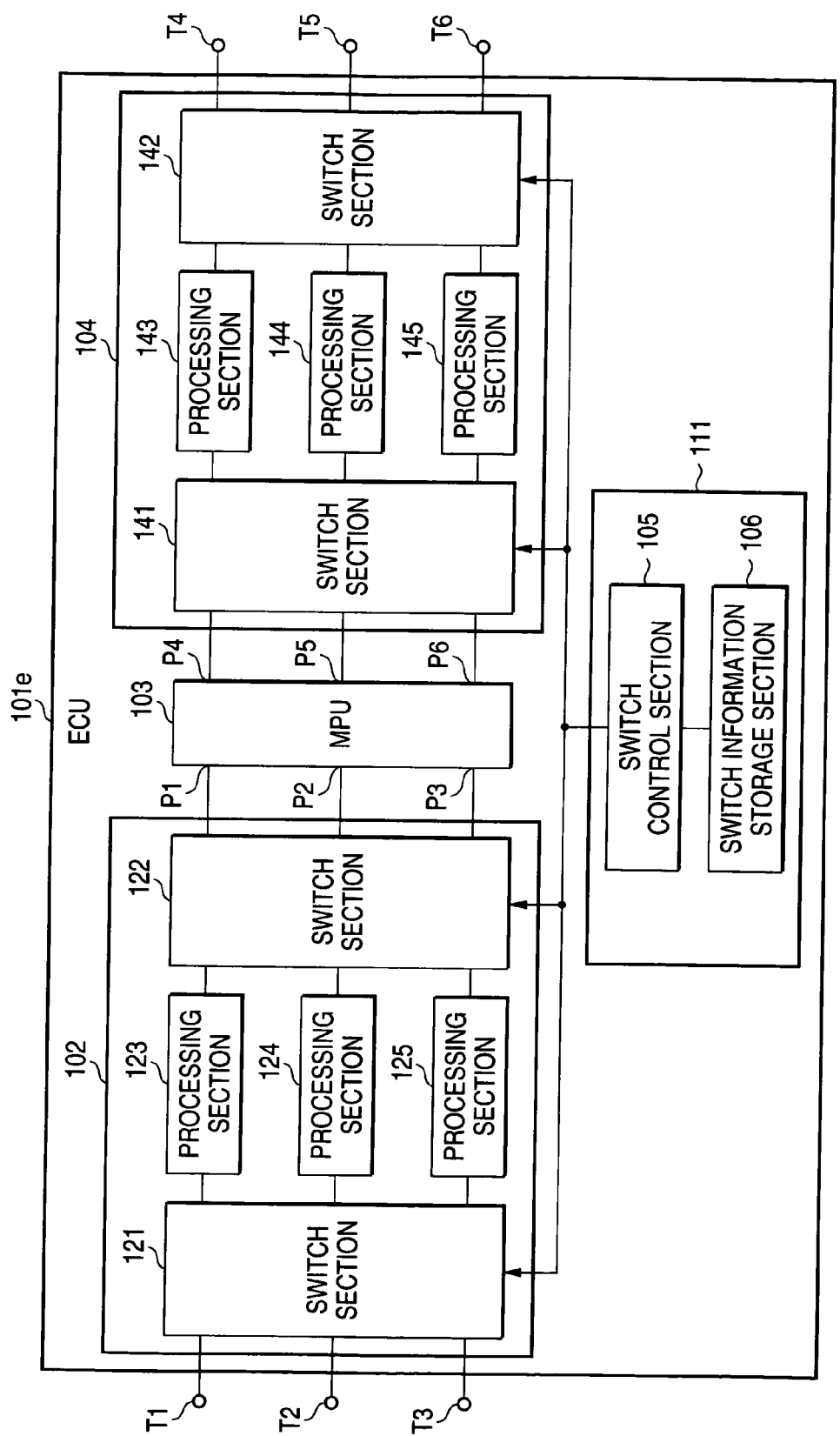
FIG. 23 is a schematic representation to describe an ECU provided with an external switch control section and an external switch information storage section.

FIG. 23 shows an ECU and a switch control section 105 and a switch information storage section 106 outside the ECU. An ECU 101e shown in the figure switches the connection state of switch sections 121, 122, 141, and 142 based on a switch request received from an external control unit 111.

The external control unit 111 includes the switch control section 105 and the switch information storage section 106 and transmits a switch request to the ECU 101e. Here, the external control unit 111 may be a unit specialized for switch control of the ECU 101e or may be a part of the function contained in a different ECU. In this manner, the processing of the ECU 101e is changed by a different ECU, whereby the ECU 101e can be caused to execute processing responsive to the processing state of the different ECU, etc.

Figure 24:
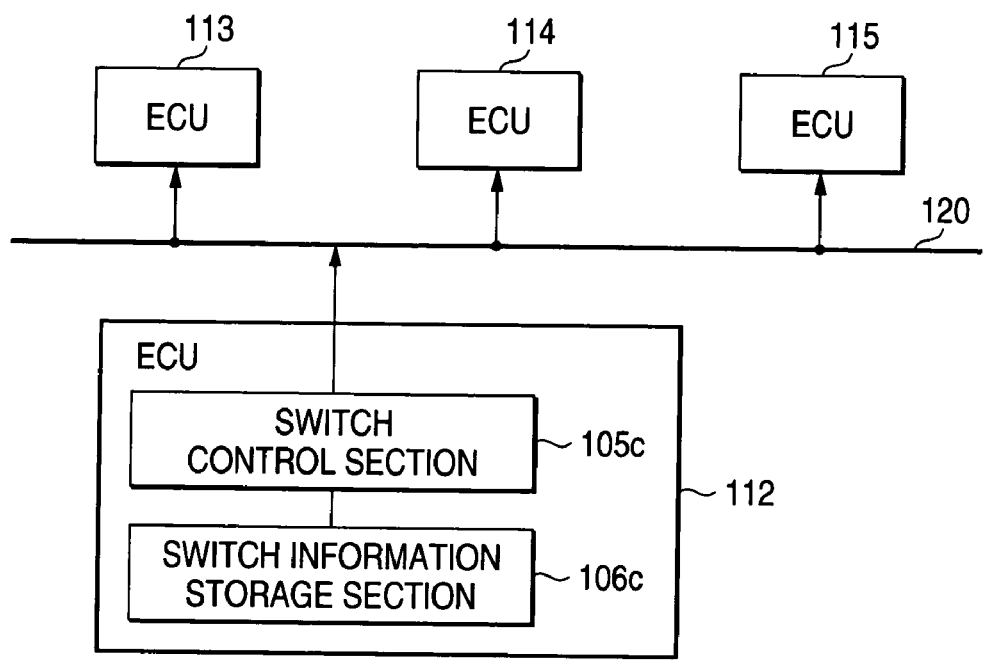
FIG. 24 is a schematic representation to describe a case where the processing of a plurality of ECUs is collectively managed.

Further, the external control unit and the ECU need not necessarily be in a one-to-one correspondence with each other. FIG. 24 is a schematic representation to describe a case where the processing of a plurality of ECUs is collectively managed. As shown in the figure, an ECU 112 is connected to ECUs 113, 114, and 115 through a network 120. Further, the ECU 112 contains a switch control section 105c and a switch information storage section 106c.

The switch information storage section 106*c* stores switch information concerning each of the ECUs 113 to 115, and the switch control section 105*c* controls the processing of the ECUs 113 to 115 through the network 120. Therefore, the ECU 112 can collectively manage the processing of the ECUs 113 to 115.

By the way, although changing of the processing of the ECU (electronic control unit) has been explained in the above description, processing of an EDU (electronic drive unit) can be changed using a similar configuration.

Figure 25:
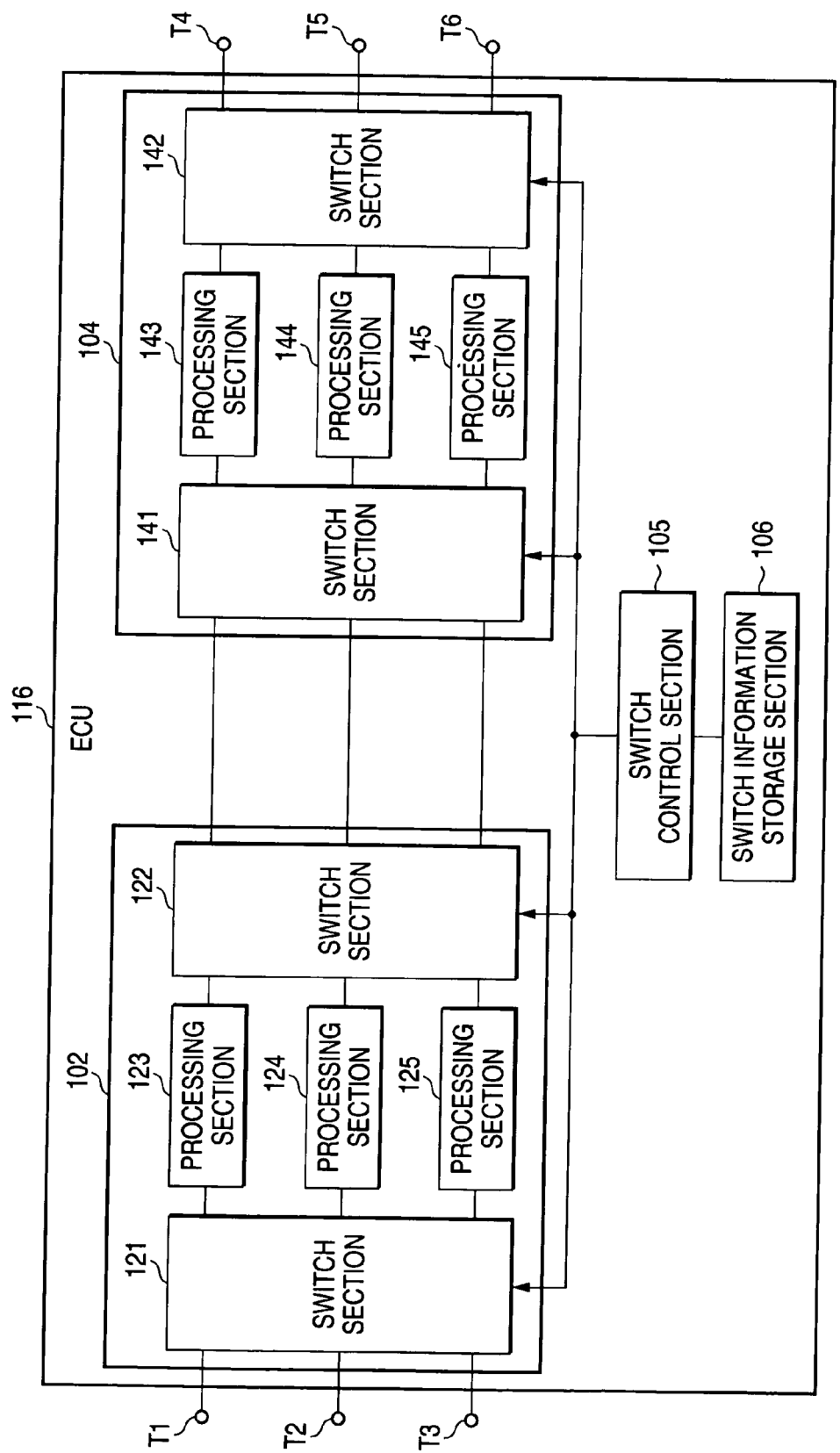
FIG. 25 is a block diagram to show the configuration of an EDU whose processing can be changed.

FIG. 25 shows a configuration example of an EDU whose processing can be changed. In the figure, an EDU 116 has an input processing circuit 102, an output processing circuit 104, a switch control section 105, and a switch information storage section 106. The input processing circuit 102 processes signals input from input terminals T1 to T3 by processing sections 123 to 125 and transmits the signals to the output processing circuit 104.

On the other hand, the output processing circuit 104 receives the signals from the input processing circuit 102, processes the signals by processing sections 143 to 145, and outputs the signals from output terminals T4 to T6. Here, the switch control section 105 can switch the connection state of witch sections 121, 122, 141, and 142 based on switch information stored in the switch information storage section 106, for changing the processing for the signals input to the input terminals T1 to T3 and the output terminals.

The internal configuration and the operation of the input processing circuit 102 and the output processing circuit 104 are similar to those of the ECU described above and therefore will not be discussed again. When the invention is thus applied to the EDU, the EDU whose processing can be changed can be provided.

By the way, the configuration previously described with reference to FIG. 17 may be applied to the ECUs and the EDU shown in FIGS. 13, 15, 16, 21, 22, 23, 24, and 25. For example, in a case of applying the configuration to the ECU shown in FIG. 23, a switch instruction is given from the switch control section outside the ECU to the switch section, a predetermined processing section is selected for an input signal, and the input signal is input to the processing section.

The processing circuits mentioned in the specification include both digital and analog processing circuits as well as circuits made up of discrete parts, etc.

Figure 26:
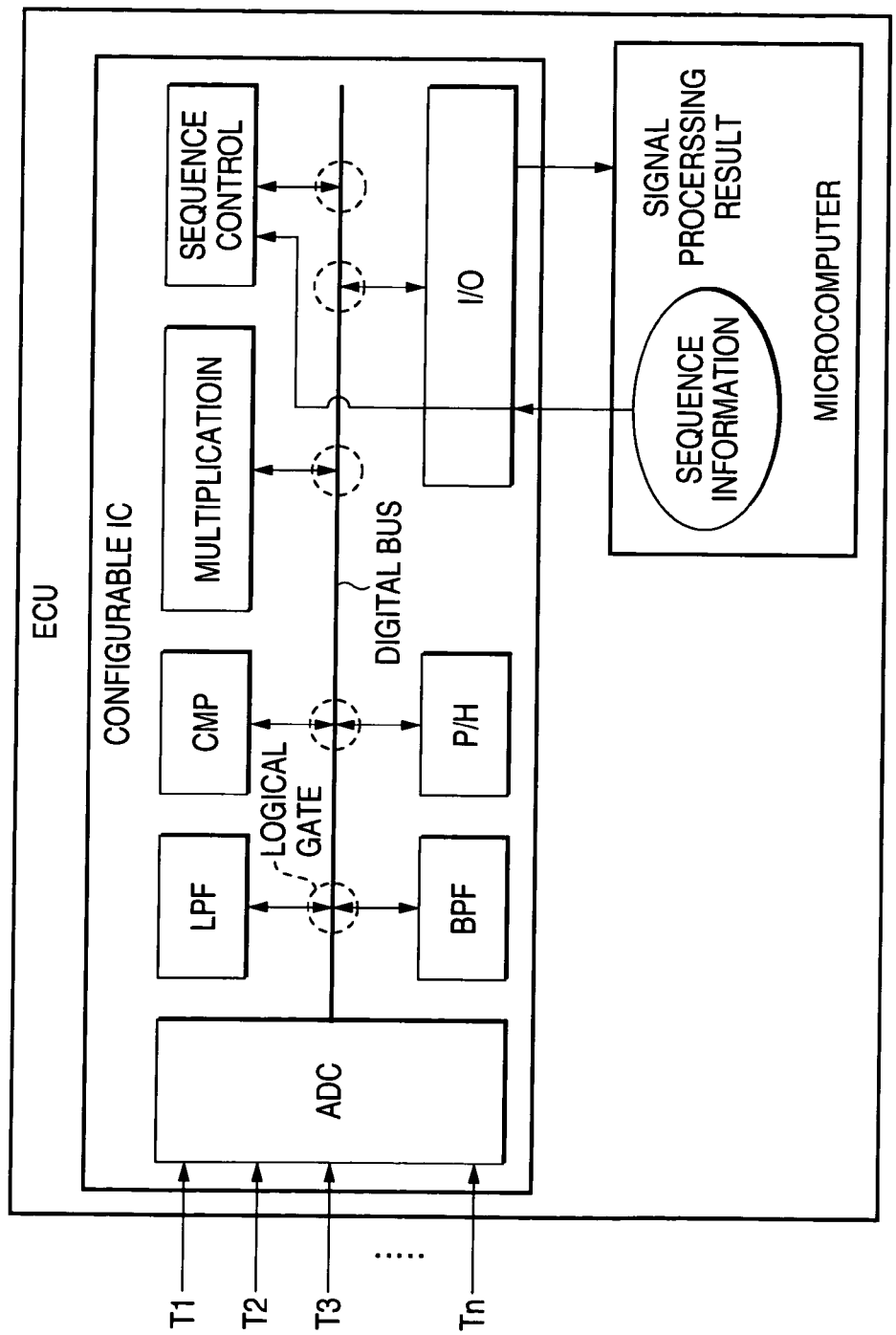
FIG. 26 is a schematic representation to describe a switch section including a digital bus and logical gates.

The switch section may be made up of not only switches, but also a digital bus and logical gates to switch connection by turning on/off the logical gates and to select a processing circuit. FIG. 26 shows the configuration of a switch section including a digital bus and logical gates. In the figure, switch information (sequence information) is stored in a microcomputer and a switch control section (sequence control) is provided in an input processing circuit (IC).

As described above, according to the embodiments of the invention, the electronic control unit is configured so that the input processing circuit is interposed between the input terminals and the operation processing section, and the processing switch section switches the processing of the input processing circuit. Thus, the electronic control unit for making it possible to change processing including changing of the hardware configuration not only at the developing time of the ECU, but also at the installing time of the ECU in a vehicle and at the repairing time of the ECU can be provided.

According to the embodiments of the invention, the electronic control unit can switch the input processing circuit based on input processing information to switch the processing accomplished by the input processing circuit as required. Further, the electronic control unit can change the processing by changing input information. Thus, the electronic control unit for making it possible to easily change processing including hardware processing can be provided.

According to the embodiments of the invention, the electronic control unit can change processing for the input signal based on the operation result of the operation processing section to perform different processing for the same input signal in response to the processing state of the operation processing. Thus, the electronic control unit for making it possible to use the same input signal through different types of processing can be provided.

According to the embodiments of the invention, the electronic control unit can switch processing of the input processing circuit in a time-sharing manner to switch processing for the input signal in response to the processing state of the operation processing. If the electronic control unit includes a plurality of input terminals, processing of the input processing circuit can be shared. Thus, small-sized electronic control unit for making it possible to switch processing for the input signal in response to the situation can be provided.

According to the embodiments of the invention, the electronic control unit includes a plurality of processing circuits different in processing and switches the processing circuit to which the input signal is to be input to change processing for the input signal. Thus, the electronic control unit for making it possible to easily switch the hardware configuration can be provided.

According to the embodiments of the invention, the electronic control unit switches the processing circuits, which executes the same processing for the input signal, so that if an anomaly occurs in the processing circuit, which is operating, the standby circuit can be used to continue the processing. Thus, the electronic control unit stably operating even if an anomaly occurs in the hardware can be provided.

According to the embodiments of the invention, the electronic control unit executes processing for the input signal by the programmable IC in which processing can be rewritten, and can change the processing by rewriting the programmable IC. Thus, the electronic control unit for making it possible to change the hardware in the simple configuration can be provided.

According to the embodiments of the invention, the electronic control unit can A/D-convert the input signal and then can process the input signal by the logical IC and change processing by rewriting the program stored in the logical IC. Thus, the electronic control unit capable of replacing processing for the input signal with digital processing for execution can be provided.

According to the embodiments of the invention, the electronic control unit can switch the connection relationships among the plurality of input terminals and the operation processing section to switch the input signal input to the operation processing section. Thus, the electronic control unit capable of switching the connection destination of the input terminal as desired can be provided.

According to the embodiments of the invention, the electronic control unit can separately process the input signals input from the plurality of input terminals to process the input signals in parallel. Thus, the electronic control unit for making it possible to use the plurality of input terminals at the same time and switch processing for the signal input from each input terminal can be provided.

According to the embodiments of the invention, the electronic control unit is configured so that the output processing circuit is interposed between the operation processing section and the output terminals, and that the processing switch section switches the processing of the output processing circuit. Thus, the electronic control unit for making it possible to switch processing for the operation result can be provided.

According to the embodiments of the invention, the electronic control unit can switch the drive current given to the operation result output by the operation processing section as desired. Thus, the electronic control unit capable of changing the drive current given to the operation result can be provided.

According to the embodiments of the invention, the electronic control unit generates the drive current given to the operation result of the operation processing section using the plurality of driver circuits in combination to increase the number of the drive currents that can be selected. Thus, small-sized electronic control unit capable of changing the drive current given to the operation result can be provided.

According to the embodiments of the invention, the electronic control unit can assign dedicated driver circuits to the plurality of output terminals and uses the driver circuits in combination to give different drive current for each output terminal. Thus, the electronic control unit capable of giving different drive currents to the output terminals can be provided.

According to the embodiments of the invention, the electronic control unit can select the driver circuit to be assigned for each output terminal from the driver circuit group shared among the output terminals to assign different drive currents to the output terminals. Thus, small-sized electronic control unit capable of giving different drive currents to the output terminals can be provided.

According to the embodiments of the invention, the electronic control unit includes the switch management section, which determines whether or not processing switch is permitted in the switching of the processing, so that switching of processing is limited. Thus, the electronic control unit capable of preventing erroneous processing switch or unauthorized processing switch can be provided.

According to the embodiments of the invention, the electronic control unit can set request authority for each type of processing to determine whether or not the switching of the processing is permitted for each processing to be switched Thus, the electronic control unit for making it possible to set permission or prohibition of processing switch in detail can be provided.

According to the embodiments of the invention, the electronic control unit manages permission or prohibition of switch depending on whether or not the identification signal satisfying request authority is input. Thus, the electronic control unit capable of determining permission or prohibition of switch based on the identification signal and preventing erroneous processing switch or unauthorized processing switch can be provided.

According to the embodiments of the invention, the electronic control unit determines whether or not switch processing is permitted depending on whether or not the data indicating a switch request contains authority information satisfying request authority. Thus, the electronic control unit capable of determining permission or prohibition of switch from the switch request itself and preventing erroneous processing switch or unauthorized processing switch can be provided.

According to the embodiments of the invention, the electronic control unit can determine whether or not switch is permitted based on position information for permitting switch only in a predetermined location. Thus, the electronic control unit capable of more strictly preventing erroneous processing switch or unauthorized processing switch can be provided.

According to the embodiments of the invention, the electronic control unit is configured so that the output processing circuit is interposed between the operation processing section and the output terminals and that the processing switch section switches the processing of the output processing circuit. Thus, the electronic control unit for making it possible to switch processing for the operation result can be provided.

According to the embodiments of the invention, the electronic control unit is configured so that a plurality of processing circuits are interposed between the input terminals and the operation processing section, and that a combination of the processing circuits is selected to switch the processing for a plurality of input signals. Thus, the electronic control unit for making it possible to change processing including changing of the hardware configuration not only at the developing time of the ECU, but also at the installing time of the ECU in a vehicle and at the repairing time of the ECU can be provided.

According to the embodiments of the invention, the electronic control unit can change the combination of the processing circuits in the input processing circuit based on the input signal to execute processing fitted to the input signal. Thus, the electronic control unit for making it possible to change the processing in response to the input signal can be provided.

According to the embodiments of the invention, the electronic control unit switches the connection between the input terminal and the processing circuit to select the processing circuit for each of a plurality of input signals. Thus, the electronic control unit for making it possible to easily change the processing in response to the input signal can be provided.

According to the embodiments of the invention, the electronic control unit is configured so that the input processing circuit is interposed between the input terminals and the operation processing section the processing of the input processing circuit is switched based on an external request. Thus, the electronic control unit for making it possible to change the processing in response to the external state can be provided.

According to the embodiments of the invention, the electronic drive unit makes it possible to set processing for the input signal and the value of the drive current given to the processing result as desired. Thus, the electronic drive unit for making it possible to change processing containing changing of the hardware configuration not only at the developing time of the ECU, but also at the installing time of the ECU in a vehicle and at the repairing time of the ECU can be provided.

What is claimed is:

1. An electronic control unit for performing operation processing of an input signal, comprising:
   an input terminal to which the input signal is input;
   an operation processing section which executes the operation processing;
   an input processing circuit which executes predetermined processing for the input signal and supplies the processed input signal to the operation processing section; and
   a processing switch section which switches the predetermined processing of the input processing circuit,
   wherein the input processing circuit includes:

a plurality of processing circuits different in processing for the input signal; and an input switch which inputs the input signal to one of the plurality of processing circuits.

2. The electronic control unit according to claim 1, wherein the processing switch section stores processing, which the input processing circuit is able to execute, as input processing information and switches the processing of the input processing circuit based on the input processing information.

3. The electronic control unit according to claim 1, wherein the processing switch section switches the processing of the input processing circuit based on an operation result output by the operation processing section.

4. The electronic control unit according to claim 1, wherein the processing switch section switches the processing of the input processing circuit in a time-sharing manner.

5. The electronic control unit as described in claim 1, wherein the input processing circuit switches the predetermined processing based on a processing change request received from an external source.

6. The electronic control unit according to claim 1, wherein:
the input processing circuit includes a plurality of processing circuits for executing the same processing for the input signal; and
when an anomaly occurs in the processing circuit, which is executing the processing, the processing switch section switches the processing circuit to another processing circuit for executing the same processing.

7. The electronic control unit according to claim 1, wherein:
the input processing circuit executes the predetermined processing for the input signal by a programmable IC; and
the processing switch section rewrites the programmable IC to switch the predetermined processing.

8. The electronic control unit according to claim 1, wherein the input processing circuit includes:
an analog/digital converter which converts the input signal into a digital signal; and
a logical IC which executes the predetermined processing for the digital signal converted by the analog/digital converter; and
the processing switch section rewrites processing stored in the logical IC to switch the predetermined processing.

9. The electronic control unit according to claim 1, wherein:
the input terminal is a plurality of input terminals; and
the input processing circuit switches a connection relationship between the plurality of input terminals and the operation processing section.

10. The electronic control unit according to claim 9, wherein the input processing circuit executes separate processing for input signals input from the plurality of input terminals, respectively.

11. The electronic control unit according to claim 1, further comprising an output processing circuit which executes second predetermined processing for an operation result output by the operation processing section and outputs a processing result, wherein:
the processing switch section switches the second predetermined processing of the output processing circuit.

12. The electronic control unit according to claim 11, wherein the second predetermined processing is processing for giving a predetermined drive current to the operation result.

13. The electronic control unit according to claim 12, wherein:
the output processing circuit includes a plurality of driver circuits; and
the output processing circuit uses the plurality of driver circuits in combination to generate the drive current given to the operation result.

14. The electronic control unit according to claim 13, further comprising a plurality of output terminals, wherein:
the output processing circuit includes a dedicated driver circuit group assigned to the plurality of output terminals; and
the output processing circuit selects at least one driver circuit used to generate the drive current from the dedicated driver circuit group.

15. The electronic control unit according to claim 13 further comprising a plurality of output terminals, wherein:
the output processing circuit includes a shared driver circuit group shared among the plurality of output terminals; and
the output processing circuit selects at least one driver circuit used to generate the drive current from the shared driver circuit group.

16. The electronic control unit according to claim 1 further comprising:
a switch management section which determines whether or not the switching of the processing is permitted, when the processing switch section switches the predetermined processing.

17. The electronic control unit according to claim 16, wherein the switch management section sets request authority for the content of the switching.

18. The electronic control unit according to claim 17, wherein if an identification signal satisfying the request authority is input in the switching, the switch management section permits the switching of the processing.

19. The electronic control unit according to claim 17, wherein if a switch request for the switching of the processing is input and data indicating the switch request contains authority information satisfying the request authority, the switch management section permits the switching requested by the switch request.

20. The electronic control unit according to claim 16, wherein:
the switch management section includes a position information acquisition section which acquires position information; and
the switch management section determines whether or not the switching is permitted based on the position information acquired by the position information acquisition section.

21. An electronic control unit for performing operation processing of an input signal, comprising:
an input terminal to which the input signal is input;
an operation processing section which executes the operation processing;
an output processing circuit which executes predetermined processing for an operation result output by the operation processing section and outputs a processing result; and
a processing switch section which switches the predetermined processing of the output processing circuit,
wherein the output processing circuit includes:

a plurality of processing circuits different in processing for the operation result; and an output processing switch which inputs the operation result to one of the plurality of processing circuits.

22. An electronic control unit for performing operation processing of a plurality of input signals, comprising:

an input terminal to which the input signal is input;

an operation processing section which executes the operation processing;

an input processing circuit including a plurality of processing circuits which execute predetermined processing for each of the plurality of input signals and supply the processed input signals to the operation processing section, and to which each of the plurality of input signals are able to be input in common; and selection means which selects at least one of the plurality of processing circuits for the input signals and inputs the input signals to the selected processing circuit.

23. The electronic control unit according to claim 22, wherein the selection means selects a plurality of processing circuits based on the input signal.

24. The electronic control unit according to claim 22, wherein:

the selection means includes a switch section which switches connection between the input signal and the processing circuit; and the selection means controls the switching of the switch section to select at least one processing circuit.

* * * * *